United States Patent
Nagai

(10) Patent No.: US 9,553,310 B2
(45) Date of Patent: Jan. 24, 2017

(54) SECONDARY BATTERY

(75) Inventor: Hiroki Nagai, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 245 days.

(21) Appl. No.: 13/879,105

(22) PCT Filed: Oct. 15, 2010

(86) PCT No.: PCT/JP2010/068212
§ 371 (c)(1),
(2), (4) Date: Apr. 12, 2013

(87) PCT Pub. No.: WO2012/049779
PCT Pub. Date: Apr. 19, 2012

(65) Prior Publication Data
US 2013/0209888 A1    Aug. 15, 2013

(51) Int. Cl.
*H01M 4/485*    (2010.01)
*H01M 4/131*    (2010.01)
(Continued)

(52) U.S. Cl.
CPC ............ *H01M 4/485* (2013.01); *H01M 4/131* (2013.01); *H01M 4/1391* (2013.01);
(Continued)

(58) Field of Classification Search
None
See application file for complete search history.

(56) References Cited

U.S. PATENT DOCUMENTS

| 5,702,845 A | 12/1997 | Kawakami et al. |
| 6,255,020 B1 | 7/2001 | Yamashita et al. |

(Continued)

FOREIGN PATENT DOCUMENTS

| JP | 10-74516 | 3/1998 |
| JP | 2000323123 A | * 11/2000 |

(Continued)

OTHER PUBLICATIONS

Machine translation of Osanai et al. JP 2000-323123 A (Nov. 2000).*

Primary Examiner — Carlos Barcena
Assistant Examiner — Wojciech Haske
(74) Attorney, Agent, or Firm — Finnegan, Henderson, Farabow, Garrett & Dunner, LLP

(57) ABSTRACT

A secondary battery according to the present invention has a current collector and a positive electrode mixture layer that coats the current collector. The positive electrode mixture layer includes a positive electrode active material, an electrically conductive material, and a binder, and the positive electrode active material is constituted by hollow-structure secondary particles formed by the aggregation of a plurality of primary particles of a lithium transition metal oxide and has a through hole penetrating from outside to a hollow portion. In addition, a particle porosity A1 of the positive electrode active material satisfies 2.0(%)≤A1≤70(%). Furthermore, a DBP absorption A2 of the positive electrode active material satisfies 23 (mL/100 g)≤A2. Moreover, the tap density A3 of the positive electrode active material satisfies 1.0 (g/mL)≤A3≤1.9 (g/mL).

13 Claims, 13 Drawing Sheets

(51) Int. Cl.
*H01M 4/1391* (2010.01)
*H01M 4/02* (2006.01)

(52) U.S. Cl.
CPC .. *H01M 2004/021* (2013.01); *H01M 2220/20* (2013.01); *Y02E 60/122* (2013.01)

(56) References Cited

U.S. PATENT DOCUMENTS

| | | | |
|---|---|---|---|
| 2002/0028380 A1* | 3/2002 | Tanjo et al. | 429/209 |
| 2005/0221182 A1 | 10/2005 | Fujiwara et al. | |
| 2007/0003835 A1 | 1/2007 | Hasegawa et al. | |
| 2012/0282525 A1 | 11/2012 | Nagai et al. | |

FOREIGN PATENT DOCUMENTS

| | | |
|---|---|---|
| JP | 2000-340226 | 12/2000 |
| JP | 2004-288644 | 10/2004 |
| JP | 2005-44722 | 2/2005 |
| JP | 2005-285606 | 10/2005 |
| JP | 2007-42579 | 2/2007 |
| JP | 2009-129889 | 6/2009 |
| JP | 2011-119092 | 6/2011 |

* cited by examiner

SECONDARY BATTERY

CROSS-REFERENCE TO RELATED APPLICATIONS

This application is a national phase application of International Application No. PCT/JP2010/068212, filed Oct. 15, 2010, the content of which is incorporated herein by reference

TECHNICAL FIELD

The present invention relates to a secondary battery. In the present description, "secondary battery" is a term which describes repetitively chargeable storage devices in general and which encompasses so-called storage batteries such as a lithium-ion secondary battery, a nickel hydride battery, and a nickel-cadmium battery as well as storage elements such as an electrical double layer capacitor.

In addition, in the present description, the term "lithium-ion secondary battery" encompasses secondary batteries which use lithium ions as electrolyte ions and in which charging and discharging are realized by the electrical charge movement accompanying lithium ions between a positive electrode and a negative electrode.

BACKGROUND ART

A lithium-ion secondary battery comprises a material (an active material) which reversibly stores and releases lithium ions (Li ions) at positive and negative electrodes, and charging and discharging are realized by the migration of lithium ions between the positive and negative electrodes. Typical examples of an active material used in an electrode (typically, a positive electrode) of such a lithium-ion secondary battery include a complex oxide containing lithium and a transition metal element. For example, a lithium complex oxide (a nickel-containing lithium complex oxide) which at least contains nickel (Ni) as the transition metal element and which has a layered structure is preferably used. Patent Literature 1 is an example of a technical document relating to active materials of lithium-ion secondary batteries.

Patent Literature 1 discloses a positive electrode active material made of lithium-containing complex oxide powder whose DBP liquid adsorption ranges from 20 to 40 ml per 100 g of lithium-containing complex oxide powder weight. In this case, for the DBP liquid adsorption of the powder, a reagent solution of the powder is titrated with a constant-rate burette using an absorptometer, a plastograph, or a plasticorder in compliance with test method A or test method B for DBP adsorption as defined in JIS K6217 (1997), a change in viscosity characteristics during the titration is measured by a torque sensor and recorded, whereby the DBP liquid adsorption of the powder is defined as an additive amount of the reagent solution corresponding to a torque that is 70% of a maximum generated torque.

CITATION LIST

Patent Literature

Patent Literature 1: Japanese Patent Application Laid-open No. 2005-285606

SUMMARY OF INVENTION

Meanwhile, lithium-ion secondary batteries have a high energy density per unit weight and are favorably considered as secondary batteries suitable as a vehicle-mounted high-output power supply. With a lithium-ion secondary battery as a vehicle-mounted power supply, particularly high output is required upon startup and acceleration. In this case, simply evaluating DBP adsorption may not be sufficient to obtain a required performance in applications where repetitive high output is needed.

A secondary battery according to the present invention comprises a current collector and a positive electrode mixture layer coated on the current collector. The positive electrode mixture layer includes a positive electrode active material, an electrically conductive material, and a binder. In addition, the positive electrode active material is constituted by hollow-structure secondary particles formed by the aggregation of a plurality of primary particles of a lithium transition metal oxide and has a through hole penetrating from outside to a hollow portion. Furthermore, with the secondary battery, a particle porosity $A1$ of the positive electrode active material satisfies $2.0(\%) \leq A1 \leq 70(\%)$, a DBP adsorption $A2$ of the positive electrode active material satisfies $23 \text{ (mL/100 g)} \leq A2$, and a tap density $A3$ of the positive electrode active material satisfies $1.0 \text{ (g/mL)} \leq A3 \leq 1.9 \text{ (g/mL)}$.

According to the secondary battery described above, an electrolyte solution can readily penetrate into the positive electrode active material, a contact surface area between the positive electrode active material 610 and the electrolyte solution is wide, and lithium ions (Li) can readily migrate between the positive electrode active material and the electrolyte solution. As a result, in particular, a required performance in applications where repetitive high output is needed can be obtained.

In this case, the particle porosity $A1$ of the positive electrode active material may satisfy $2.4(\%) \leq A1$. Alternatively, the particle porosity $A1$ of the positive electrode active material may satisfy $25(\%) \leq A1$. Alternatively, the DBP absorption $A2$ of the positive electrode active material may satisfy $A2 \leq 54 \text{ (mL/100 g)}$. Alternatively, the particle porosity $A1$ of the positive electrode active material may satisfy $A1 \leq 66(\%)$. Alternatively, a particle diameter D as defined by D50 of the secondary particles of the positive electrode active material may satisfy $3 \text{ } (\mu m) \leq D \leq 7 \text{ } (\mu m)$. Alternatively, a specific surface area E of the secondary particles of the positive electrode active material may satisfy $0.8 \text{ } (m^2/g) \leq E \leq 1.5 \text{ } (m^2/g)$. Alternatively, an average opening width of the through hole may be equal to or greater than 0.01 μm. Alternatively, an average opening width of the through hole may be equal to or less than 2.0 μm. Alternatively, the positive electrode mixture layer may be obtained by rolling after a positive electrode mixture is coated on a current collector and then dried.

DESCRIPTION OF EMBODIMENTS

Figure 1:
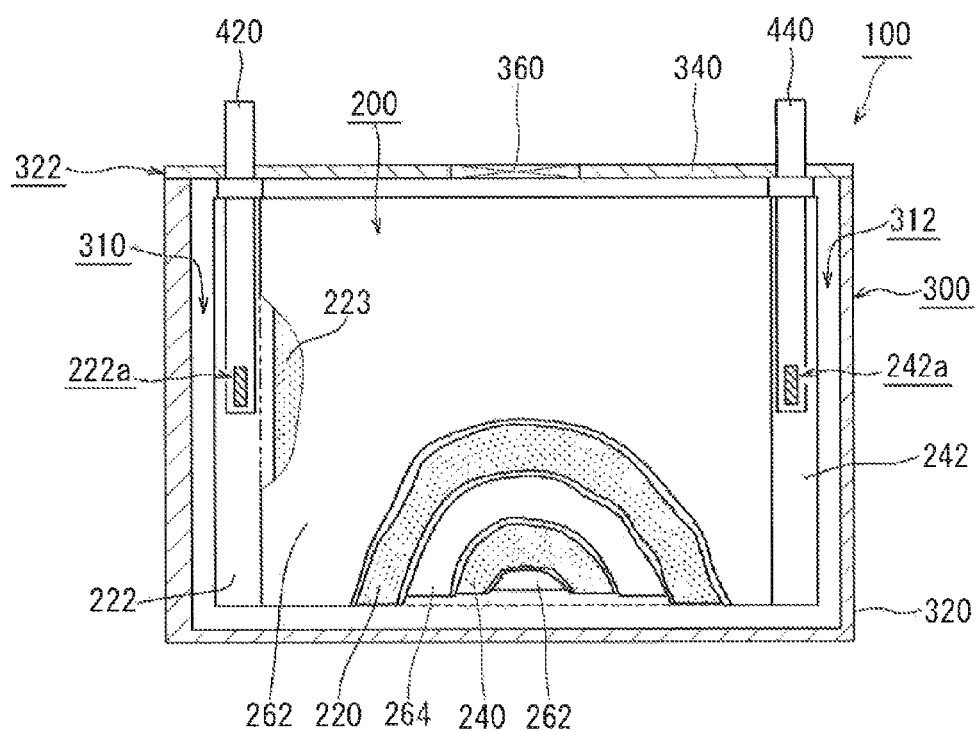
FIG. 1 is a diagram showing an example of a structure of a lithium-ion secondary battery.

Hereinafter, a secondary battery according to an embodiment of the present invention will be described with reference to the drawings. Members and portions that produce same effects are denoted by same reference characters whenever appropriate. In addition, it will be recognized that the respective drawings are merely schematic renderings and therefore are not necessarily actual reflections of the elements shown. First, an example of a structure of a lithium-ion secondary battery will be described as one example a secondary battery according to the present invention. Subsequently, a positive electrode mixture layer of a lithium-ion secondary battery will be described. Finally, an evaluation test of a lithium-ion secondary battery will be described.

Figure 2:
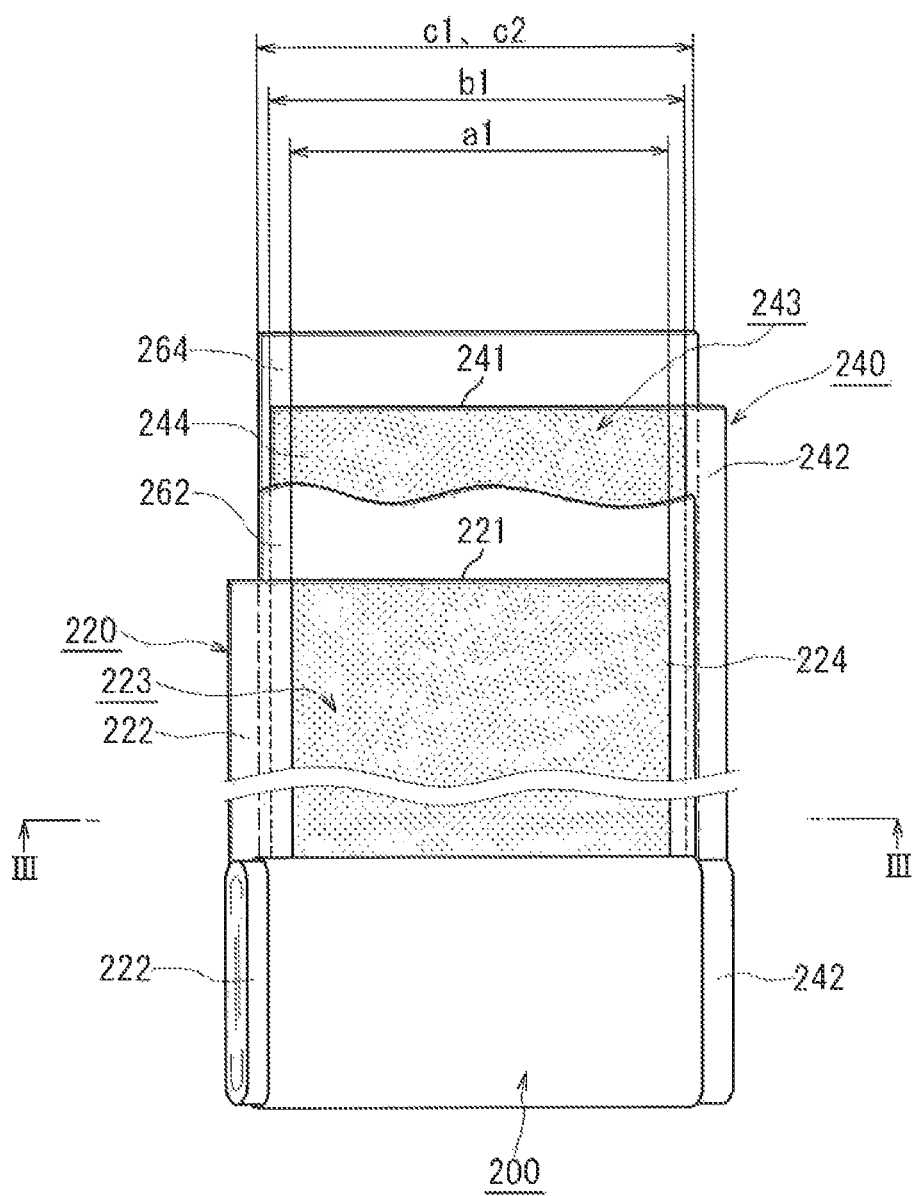
FIG. 2 is a diagram showing a wound electrode body of a lithium-ion secondary battery.
Figure 3:
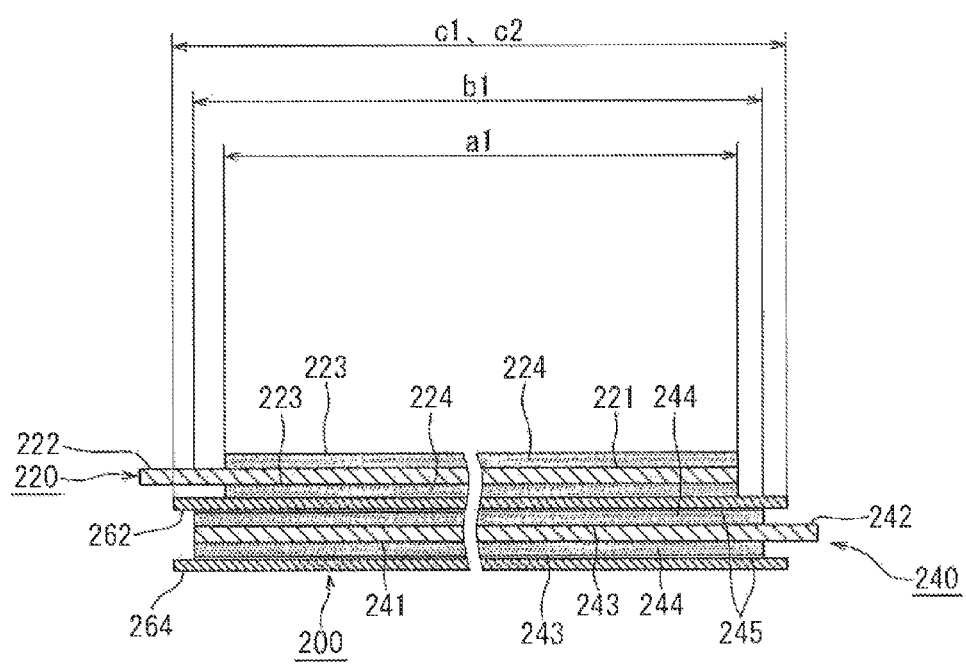
FIG. 3 is a diagram showing a cross-section taken along line III-III in FIG. 2.

FIG. 1 shows a lithium-ion secondary battery 100. As shown in FIG. 1, the lithium-ion secondary battery 100 comprises a wound electrode body 200 and a battery case 300. Furthermore, FIG. 2 is a diagram showing the wound electrode body 200. FIG. 3 shows a cross-section taken along line III-III in FIG. 2.

As shown in FIG. 2, the wound electrode body 200 comprises a positive electrode sheet 220, a negative electrode sheet 240, and separators 262 and 264. The positive electrode sheet 220, the negative electrode sheet 240, and the separators 262 and 264 are respectively band-like sheet materials.

<Positive Electrode Sheet 220>

As shown in FIG. 2, the positive electrode sheet 220 comprises a band-like positive electrode current collector 221 (positive electrode core). A metallic foil suitable for a positive electrode may be preferably used as the positive electrode current collector 221. A band-like aluminum foil having a predetermined width is used as the positive electrode current collector 221. In addition, the positive electrode sheet 220 comprises an uncoated portion 222 and a positive electrode mixture layer 223. The uncoated portion 222 is set along one width-direction edge of the positive electrode current collector 221. The positive electrode mixture layer 223 is a layer coated with a positive electrode mixture 224 containing a positive electrode active material. With the exception of the uncoated portion 222 set on the positive electrode current collector 221, the positive electrode mixture 224 coats both surfaces of the positive electrode current collector 221.

<Positive Electrode Mixture 224, Positive Electrode Active Material>

In this case, the positive electrode mixture 224 is a mixture of a positive electrode active material, an electrically conductive material, a binder, and the like. A material used as a positive electrode active material of a lithium-ion secondary battery can be used as the positive electrode active material. Examples of a positive electrode active material include lithium transition metal oxides such as $LiNiCoMnO_2$ (lithium-nickel-cobalt-manganese complex oxide), $LiNiO_2$ (lithium nickelate), $LiCoO_2$ (lithium cobaltate), $LiMn_2O_4$ (lithium manganate), and $LiFePO_4$ (iron lithium phosphate). For example, $LiMn_2O_4$ has a spinel structure. In addition, $LiNiO_2$ and $LiCoO_2$ have a layered evaporitic structure. Furthermore, for example, $LiFePO_4$ has an olivine structure. $LiFePO_4$ having an olivine structure includes, for example, particles in the order of nanometers. In addition, $LiFePO_4$ having an olivine structure can be further coated by a carbon film.

<Electrically Conductive Material>

The positive electrode mixture 224 may contain the positive electrode active material as well as other arbitrary components such as an electrically conductive material or a binder as necessary. Examples of the electrically conductive material include carbon materials such as carbon powders and carbon fibers. One type of material selected from such electrically conductive materials may be used alone or two or more types may be used in combination. Examples of carbon powders that can be used include various types of carbon black (such as acetylene black, oil furnace black, graphitized carbon black, carbon black, graphite, and Ketjen black) and graphite powder.

<Binder, Thickener, and Solvent>

For the binder, a polymer can be used which is dispersible or dissolvable in the solvent used. For example, in a positive electrode mixture composition that uses an aqueous solvent, a water-soluble or water-dispersible polymer can be used favorably, examples of which include: cellulose-based polymers (for example, polyvinyl alcohol (PVA) and polytetrafluoroethylene (PTFE)) such as carboxymethyl cellulose (CMC) or hydroxypropyl methyl cellulose (HPMC); fluorine-based resins (for example, a vinyl acetate copolymer and styrene butadiene rubber (SBR)) such as tetrafluoroethylene-hexafluoropropylene copolymer (FEP); and rubbers such as an acrylic acid-modified SBR resin (SBR latex). In addition, in a positive electrode mixture composition that uses a non-aqueous solvent, polymers such as polyvinylidene fluoride (PVDF) or polyvinylidene chloride (PVDC) can be used favorably. In addition to functioning as a binder, the above-mentioned examples of polymer materials can also be used for the purpose of demonstrating a function as a thickener or other additives in the above-mentioned composition. Any aqueous solvent or non-aqueous solvent can be used as the solvent. A preferable example of a non-aqueous solvent is N-methyl-2-pyrrolidone (NMP).

A weight ratio of the positive electrode active material in the entire positive electrode mixture is favorably approximately 50% by weight or more (and typically 50 to 95% by weight), and normally the ratio is more favorably approximately 70 to 95% by weight (for example, 75 to 90% by weight). In addition, the ratio of the electrically conductive material in the entire positive electrode mixture can favorably be, for example, approximately 2 to 20% by weight, and normally the ratio is favorably approximately 2 to 15% by weight. In a composition that uses a binder, the ratio of the binder in the entire positive electrode mixture can be, for example, approximately 1 to 10% by weight, and normally the ratio is favorably approximately 2 to 5% by weight.

<Negative Electrode Sheet 240>

As shown in FIG. 2, the negative electrode sheet 240 comprises a band-like negative electrode current collector 241 (negative electrode core). A metallic foil suitable for a negative electrode may be preferably used as the negative electrode current collector 241. In the present embodiment, a band-like copper foil having a predetermined width is used as the negative electrode current collector 241. In addition, the negative electrode sheet 240 comprises an uncoated portion 242 and a negative electrode mixture layer 243. The uncoated portion 242 is set along one width-direction edge of the negative electrode current collector 241. The negative electrode mixture layer 243 is a layer coated with a negative electrode mixture 244 containing a negative electrode active material. With the exception of the uncoated portion 242 set on the negative electrode current collector 241, the negative electrode mixture 244 coats both surfaces of the negative electrode current collector 241.

<Negative Electrode Mixture 244>

In this case, the negative electrode mixture 244 is a mixture of a negative electrode active material, a conductive material, a binder, and the like. A material used as a negative electrode active material of a lithium-ion secondary battery can be used as the negative electrode active material. Examples of a negative electrode active material include carbon-based materials such as natural graphite, artificial graphite, and an amorphous carbon of natural graphite or artificial graphite, lithium transition metal oxide, and lithium transition metal nitride. Moreover, a negative electrode active material is itself electrically conductive. Therefore, an electrically conductive material is added to the negative electrode mixture 244 when necessary. In addition, in this example, a heat-resistant layer (HRL) 245 is further formed on a surface of the negative electrode mixture layer 243 as shown in FIG. 3. The heat-resistant layer 245 is mainly formed of a metal oxide (for example, alumina). Moreover, in this lithium-ion secondary battery 100, the heat-resistant layer 245 is formed on a surface of the negative electrode mixture layer 243. Although not shown, for example, a heat-resistant layer may be formed on surfaces of the separators 262 and 264.

<Negative Electrode Active Material>

Furthermore, one type or two or more types of materials conventionally used in lithium-ion secondary batteries can be used without particular limitation for the negative electrode active material. Examples of these materials include particulate carbon materials (carbon powder) containing a graphite structure (a layered structure) in at least a portion thereof. More specifically, carbon materials having a so-called graphitic structure (graphite), a non-graphitizable carbonaceous structure (hard carbon), a graphitizable carbonaceous structure (soft carbon), or a combination thereof can be used. For example, graphite particles such as natural graphite can be used. Furthermore, an appropriate quantity of a thickener is mixed into the negative electrode mixture in order to maintain dispersion of the negative electrode active material. A thickener, a binder, or an electrically conductive material similar to those used in the positive electrode mixture can be used in the negative electrode mixture.

Although there are no particular limitations thereon, the ratio of the negative electrode active material in the entire negative electrode mixture can be approximately 80% by weight or more (for example, 80 to 99% by weight). Favorably, the ratio of the negative electrode active material in the entire negative electrode mixture is approximately 90% by weight or more (for example, 90 to 99% by weight, and more favorably, 95 to 99% by weight). In a composition that uses a binder, the ratio of the binder in the entire negative electrode mixture can be, for example, approximately 0.5 to 10% by weight, and normally the ratio is favorably approximately 1 to 5% by weight. The positive electrode mixture layer 223 and the negative electrode mixture layer 243 are respectively formed by being coated onto the positive electrode current collector 221 or the negative electrode current collector 241 and by being subsequently subjected to drying and rolling.

<Coating of Mixture>

In the coating step, the positive electrode mixture 224 or the negative electrode mixture 244 is coated onto a sheet-shaped current collector. A conventionally known suitable coating device such as a slit coater, a die coater, a comma coater or a gravure coater can be used for the coating step. In this case, by using an elongated band-like sheet-shaped current collector, the positive electrode mixture 224 or the negative electrode mixture 244 can be continuously coated on the current collector.

<Drying Step>

In the drying step, the positive electrode mixture or the negative electrode mixture coated on the sheet-shaped current collector is dried. When doing so, suitable drying conditions may be set in order to prevent migration. In this case, by using an elongated band-like sheet-shaped current collector and passing the current collector along a guideway provided inside a drying oven, the positive electrode mixture 224 or the negative electrode mixture 244 coated on the current collector can be continuously dried.

<Rolling Step>

Furthermore, in the rolling step, the positive electrode mixture layer 223 or the negative electrode mixture layer 243 dried in the drying step is pressed in a thickness direction to obtain a sheet-shaped positive electrode (positive electrode sheet) having target physical properties. Examples of methods that can be suitably used to carry out the pressing described above include conventionally known roll pressing methods and plate pressing methods.

<Separators 262 and 264>

The separators 262 and 264 are members that separate the positive electrode sheet 220 and the negative electrode sheet 240 from each other. In this example, the separators 262 and 264 are constituted by band-like sheet members with a predetermined width which have a plurality of minute holes. For example, a separator made of a porous polyolefin-based resin and having a single-layer structure or a laminated structure may be used as the separators 262 and 264. In this example, as shown in FIGS. 2 and 3, a width b1 of the negative electrode mixture layer 243 is slightly wider than a width a1 of the positive electrode mixture layer 223. Furthermore, widths c1 and c2 of the separators 262 and 264 are slightly wider than the width b1 of the negative electrode mixture layer 243 (c1, c2>b1>a1).

<Wound Electrode Body 200>

The positive electrode sheet 220 and the negative electrode sheet 240 of the wound electrode body 200 are laminated and wound with the separators 262 and 264 interposed between the positive electrode sheet 220 and the negative electrode sheet 240.

In this example, as shown in FIG. 2, the positive electrode sheet 220, the negative electrode sheet 240, and the separators 262 and 264 are laminated with their lengthwise directions aligned in an order of: the positive electrode sheet 220, the separator 262, the negative electrode sheet 240, and the separator 264. In doing so, the separators 262 and 264 are laminated onto the positive electrode mixture layer 223 and the negative electrode mixture layer 243. Furthermore, the width of the negative electrode mixture layer 243 is slightly wider than that of the positive electrode mixture layer 223 and the negative electrode mixture layer 243 is laminated so as to cover the positive electrode mixture layer 223. Accordingly, lithium ions (Li) can migrate more reliably between the positive electrode mixture layer 223 and the negative electrode mixture layer 243 during charging and discharging.

In addition, an uncoated portion 222 of the positive electrode sheet 220 and an uncoated portion 242 of the negative electrode sheet 240 are laminated so as to mutually protrude toward opposite sides in the width direction of the separators 262 and 264. The laminated sheet material (for example, the positive electrode sheet 220) is wound around a winding axis set in the width direction.

Moreover, with the wound electrode body 200, the positive electrode sheet 220, the negative electrode sheet 240, and the separators 262 and 264 are wound laminated in a predetermined order. In this process, the respective sheets are laminated while controlling positions thereof using a positioning mechanism such as EPC (edge position control). In doing so, the negative electrode mixture layer 243 is laminated so as to cover the positive electrode mixture layer 223 albeit in a state where the separators 262 and 264 are interposed between the negative electrode mixture layer 243 and the positive electrode mixture layer 223.

<Battery Case 300>

Furthermore, in this example, as shown in FIG. 1, the battery case 300 is a so-called square battery case and comprises a container main body 320 and a lid 340. The container main body 320 has a bottomed square tube shape and is a flat box-shaped container with one side surface (upper surface) opened. The lid 340 is a member which is attached to the opening (upper surface opening) of the container main body 320 and which blocks the opening.

With a vehicle-mounted secondary battery, weight energy efficiency (capacity of battery per unit weight) is desirably improved in order to improve fuel efficiency. Therefore, a light-weight metal such as aluminum or an aluminum alloy (in this example, aluminum) is adopted as the container main body 320 and the lid 340 constituting the battery case 300. Accordingly, weight energy efficiency can be improved.

The battery case 300 has a flat rectangular inner space as a space for housing the wound electrode body 200. In addition, as shown in FIG. 1, a width of the flat inner space of the battery case 300 is slightly greater than the wound electrode body 200. In the present embodiment, the wound electrode body 200 is housed in the inner space of the battery case 300. As shown in FIG. 1, the wound electrode body 200 is housed in the battery case 300 in a state where the wound electrode body 200 is flatly deformed in one direction that is perpendicular to the winding axis.

In the present embodiment, the battery case 300 comprises the container main body 320 having a bottomed square tube shape and the lid 340 that blocks the opening of the container main body 320. In this case, for example, the container main body 320 may be molded by deep-draw molding or impact molding. Impact molding is a type of cold forging and is also referred to as impact extruding and impact pressing.

Furthermore, electrode terminals 420 and 440 are attached to the lid 340 of the battery case 300. The electrode terminals 420 and 440 penetrate the battery case 300 (the lid 340) and reach the outside of the battery case 300. Moreover, a safety valve 360 is provided on the lid 340.

In this example, the wound electrode body 200 is attached to the electrode terminals 420 and 440 which are attached to the battery case 300 (in this example, the lid 340). The wound electrode body 200 is housed in the battery case 300 in a state where the wound electrode body 200 is flatly deformed in one direction that is perpendicular to the winding axis. In addition, in the wound electrode body 200, the uncoated portion 222 of the positive electrode sheet 220 and the uncoated portion 242 of the negative electrode sheet 240 mutually protrude toward opposite sides in the width direction of the separators 262 and 264. Among the electrode terminals, one electrode terminal 420 is fixed to the uncoated portion 222 of the positive electrode current collector 221 and the other electrode terminal 440 is fixed to the uncoated portion 242 of the negative electrode current collector 241.

Figure 4:
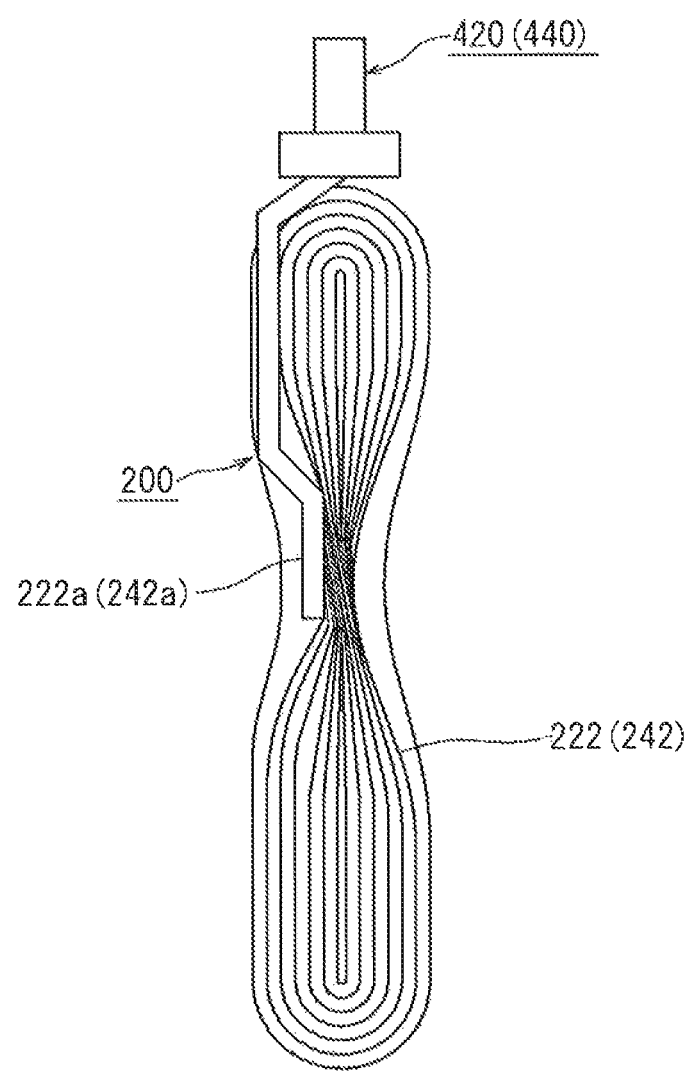
FIG. 4 is a side view showing a welding location of an uncoated portion and an electrode terminal of a wound electrode body.

In addition, in this example, as shown in FIG. 1, the electrode terminals 420 and 440 of the lid 340 extend to intermediate portions 222a and 242a of the uncoated portions 222 and 242 of the wound electrode body 200. Tips of the electrode terminals 420 and 440 are welded to the respective intermediate portions of the uncoated portions 222 and 242. FIG. 4 is a side view showing a welding location of the uncoated portions 222 and 242 and the electrode terminals 420 and 440 of the wound electrode body 200.

As shown in FIG. 4, on both sides of the separators 262 and 264, the uncoated portion 222 of the positive electrode current collector 221 and the uncoated portion 242 of the negative electrode current collector 241 are spirally exposed. In the present embodiment, the uncoated portions 222 and 242 are respectively assembled at the intermediate portions thereof and are welded to the tips of the electrode terminals 420 and 440. When doing so, due to differences in the respective materials, for example, ultrasonic welding is used to weld the electrode terminal 420 and the positive electrode current collector 221 to each other. In addition, for example, resistance welding is used to weld the electrode terminal 440 and the negative electrode current collector 241 to each other.

As described above, the wound electrode body 200 is attached to the electrode terminals 420 and 440 fixed to the lid 340 in a state where the wound electrode body 200 is pressed and bent flat. This wound electrode body 200 is housed in the flat inner space of the container main body 320. After the wound electrode body 200 is housed, the container main body 320 is blocked by the lid 340. A joint 322 (refer to FIG. 1) of the lid 340 and the container main body 320 is welded and sealed by, for example, laser welding. As described above, in this example, the wound electrode body 200 is positioned inside the battery case 300 by the electrode terminals 420 and 440 fixed to the lid 340 (the battery case 300).

Electrolyte Solution>

Subsequently, an electrolyte solution is injected into the battery case 300 from an inlet provided on the lid 340. As the electrolyte solution, for example, an electrolyte solution in which $LiPF_6$ is contained at a concentration of approximately 1 mol/liter in a mixed solvent of ethylene carbonate and diethyl carbonate (for example, a mixed solvent with a volume ratio of around 1:1) is used. Subsequently, a metallic sealing cap is attached (for example, by welding) to the inlet to seal the battery case 300. Moreover, as the electrolyte solution, a non-aqueous electrolyte solution conventionally used in a lithium-ion secondary battery can be used.

<Outgassing Path>

In addition, in this example, the flat inner space of the battery case 300 is slightly wider than the flatly-deformed wound electrode body 200. Gaps 310 and 312 are provided on both sides of the wound electrode body 200 between the wound electrode body 200 and the battery case 300. The gaps 310 and 312 act as outgassing paths.

With the lithium-ion secondary battery 100 configured as described above, temperature rises when an overcharge occurs. When the temperature of the lithium-ion secondary battery 100 rises, the electrolyte solution is decomposed and a gas is generated. The generated gas passes through the gaps 310 and 312 on both sides of the wound electrode body 200 between the wound electrode body 200 and the battery case 300 and through the safety valve 360, and is smoothly discharged to the outside. In this lithium-ion secondary battery 100, the positive electrode current collector 221 and the negative electrode current collector 241 are electrically connected to an external device through the electrode terminals 420 and 440 which penetrate the battery case 300.

<Other Battery Modes>

Moreover, the above description represents an example of a lithium-ion secondary battery. However, lithium-ion secondary batteries are not limited to the mode described above. Similarly, an electrode sheet obtained by coating a metallic foil with an electrode mixture may be used in various other battery modes. For example, a cylindrical battery and a laminated battery are known as other battery modes. A cylindrical battery is a battery in which a wound electrode body is housed in a cylindrical battery case. In addition, a laminated battery is a battery in which a positive electrode sheet and a negative electrode sheet are laminated with a separator interposed between the positive electrode sheet and the negative electrode sheet. Moreover, while the lithium-ion secondary battery 100 is exemplified above, secondary batteries other than a lithium-ion secondary battery may also adopt similar structures.

Hereinafter, a positive electrode mixture layer 223 according to the present embodiment will be described.

<Positive Electrode Mixture Layer 223>

Figure 5:
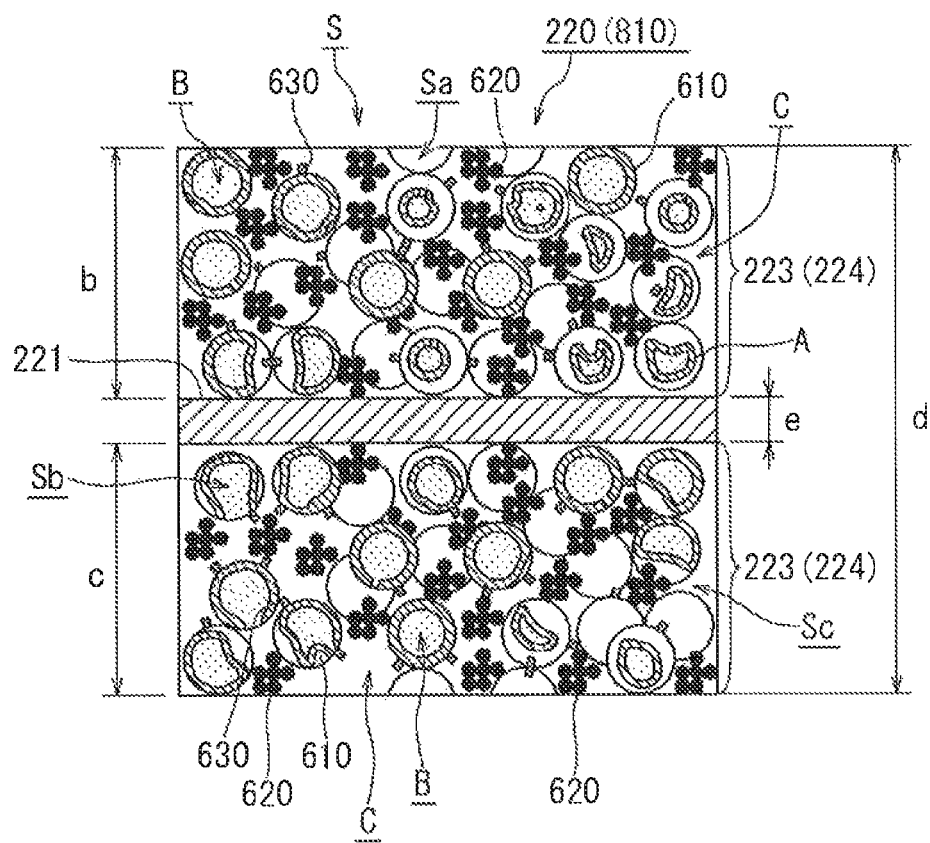
FIG. 5 is a sectional view showing a structure of a positive electrode mixture layer.

FIG. 5 is a sectional view of the positive electrode sheet 220 of the lithium-ion secondary battery 100. Moreover, in FIG. 5, the positive electrode active material 610 and the electrically conductive material 620 in the positive electrode mixture layer 223 are schematically depicted enlarged so as to clarify the structure of the positive electrode mixture layer 223. In the present embodiment, with the positive electrode sheet 220, both surfaces of the positive electrode current collector 221 are respectively coated by the positive electrode mixture 224 as shown in FIG. 5. This layer of the positive electrode mixture 224 (the positive electrode mixture layer 223) includes the positive electrode active material 610, the electrically conductive material 620, and a binder 630. In the present embodiment, the positive electrode mixture layer 223 further includes the binder 630 (a binding agent).

For example, a sectional sample of the positive electrode mixture layer 223 such as that shown in FIG. 5 may be obtained as a sectional SEM image. In this case, a sectional SEM image is a sectional photograph taken by an electron microscope. For example, an arbitrary section of the positive electrode sheet 220 may be obtained by a CP process (Cross Section Polisher process). For example, a scanning electron microscope (FE-SEM) HITACHI S-4500 manufactured by Hitachi High-Technologies Corporation, can be used as the electron microscope.

<Holes of Positive Electrode Mixture Layer 223>

As described above, the positive electrode mixture layer 223 is created by coating a positive electrode mixture onto a current collector (metal film), which is then subjected to drying and rolling. As shown in FIG. 5, in the positive electrode mixture layer 223, respective particles are bonded to each other due to the effect of the binder 630. Since the positive electrode mixture layer 223 is in a state where the positive electrode active material 610 and the electrically conductive material 620 are bonded by the binder 630, many minute cavities exist among the respective particles. In addition, the electrically conductive material 620 is smaller than the positive electrode active material 610 (secondary particles) and penetrate into a plurality of gaps of the positive electrode active material 610. The positive electrode active material 610 and the positive electrode current collector 221 are electrically connected to each other by the electrically conductive material 620. In addition, the positive electrode mixture layer 223 has minute gaps which may be described as cavities. An electrolyte solution (not shown) penetrates into the minute gaps of the positive electrode mixture layer 223. Here, the gaps (cavities) formed inside the positive electrode mixture layer 223 will be referred to as "holes" when appropriate.

<Positive Electrode Active Material 610>

Figure 6:
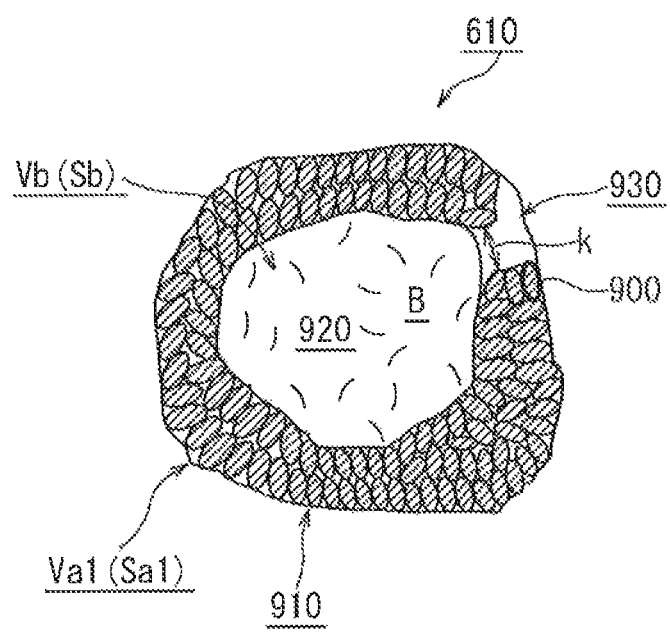
FIG. 6 is a cross sectional diagram showing an example of positive electrode active material particles.

FIG. 6 schematically shows the positive electrode active material 610. As shown in FIG. 6, in the present embodiment, the positive electrode active material 610 includes secondary particles 910, a hollow portion 920, and a through hole 930. In this case, the secondary particles 910 are particles formed by the aggregation of a plurality of primary particles (not shown) of a lithium transition metal oxide. The hollow portion 920 is an internal hole formed in the secondary particles 910. The through hole 930 is a hole that penetrates the secondary particles 910 so as to connect the outside of the secondary particles 910 with the hollow portion 920. In this case, "hollow-structure positive electrode active material 610" refers to the secondary particles 910 which include the hollow portion 920 and the through hole 930. The secondary particles have a particle diameter ranging from approximately 3 μm to 10 μm and more favorably from approximately 3 μm to 8 μm. Note that a median diameter (d50) obtained from a particle size distribution as measured by a particle size distribution analyzer based on a light scattering method is adopted as the particle diameter.

<Electrically Conductive Material 620>

In addition, for the electrically conductive material 620, carbon powders such as acetylene black, oil furnace black, graphitized carbon black, carbon black, graphite, Ketjen black, and graphite powder can be used. In this case, one type of a carbon powder or a plurality of types of carbon powder may be mixed at a predetermined ratio for the electrically conductive material 620. Here, the electrically conductive material 620 has a smaller particle diameter than the positive electrode active material 610. For example, the particle diameter of the electrically conductive material 620 ranges from approximately 10 μm to 100 μm.

Hereinafter, the positive electrode active material 610 will be described in greater detail.

With the hollow-structure positive electrode active material 610 described above, the through hole 930 is favorably formed in a size which allows an electrolyte solution to more reliably penetrate into the hollow portion 920. Therefore, for example, an average opening width k of the through hole 930 is favorably 0.01 μm or more. Accordingly, effects obtainable when the electrolyte solution penetrates into the hollow portion 920 can be more reliably obtained. Here, the opening width k of the through hole 930 refers to a length extending across the narrowest portion of the through hole 930 (an inner diameter of the through hole 930) among a path extending to the hollow portion 920 from the outside of the active material particles through the secondary particles. Moreover, when there are a plurality of through holes 930 in the hollow portion 920, an evaluation may be performed with the through hole 930 having the greatest opening width k among the plurality of through holes 930. Alternatively, the average opening width k of the through hole 930 may be 2.0 μm or less.

In addition, 1 to 20 through holes 930 may exist on average in each particle of the hollow-structure positive electrode active material 610. According to the positive electrode active material 610 with such a structure, favorable battery performance can be more stably demonstrated (for example, by inhibiting deterioration caused by charge-discharge cycling). Moreover, the number of through holes 930 in the hollow-structure positive electrode active material 610 may be obtained by, for example, ascertaining the number of through holes per particle for at least 10 or more arbitrarily selected active material particles and then calculating an arithmetic average thereof.

A method of producing the hollow-structure positive electrode active material 610 described above favorably includes, for example, a raw material hydroxide formation step, a mixing step, and a calcining step.

In this case, the raw material hydroxide formation step is a step of supplying ammonium ions to an aqueous solution of a transition metal compound and precipitating particles of a transition metal hydroxide from the aqueous solution. The aqueous solution favorably contains at least one transition metal element that composes the lithium transition metal oxide. In addition, the raw material hydroxide formation step favorably includes a nucleation stage and a particle growth stage. In this case, the nucleation stage is a stage in which the transition metal hydroxide is precipitated from an aqueous solution at a pH equal to or higher than 12 and an ammonium ion concentration equal to or lower than 25 g/L. The particle growth stage is a stage in which the transition metal hydroxide precipitated in the nucleation stage is grown at a pH lower than 12 and an ammonium ion concentration equal to or higher than 3 g/L.

Furthermore, the mixing step is a step of mixing particles of the transition metal hydroxide obtained in the raw material hydroxide formation step with a lithium compound to prepare an unfired mixture.

Moreover, the calcining step is a step of calcining the mixture obtained in the mixing step to obtain active material particles.

With the production method described above, the positive electrode active material 610 with a holed hollow structure such as that shown in FIG. 6 can be appropriately produced.

In addition, in this case, the calcining step may be carried out such that a maximum calcining temperature ranges from 800° C. to 1100° C. As a result, since the primary particles can be adequately sintered, active material particles having a desired average hardness can be suitably produced. This calcining step is preferably carried out so that, for example, secondary particles are formed in which gaps are substantially not present at the grain boundaries of the primary particles at portions other than the hollow portion 920 and the through holes 930.

Furthermore, the calcining step may include a first calcining stage in which the mixture is fired at a temperature T1 ranging from 700° C. to 900° C. and a second calcining stage in which the result of the first calcining stage is fired at a temperature T2 which ranges from 800° C. to 1100° C. and which is higher than the calcining temperature T1 of the first calcining stage.

In a preferable aspect of the active material particle production method disclosed herein, the calcining step includes a first calcining stage, in which the mixture is fired at a temperature T1 ranging from 700° C. to 900° C., and a second calcining stage, in which the result of the first calcining stage is fired at a temperature T2 which ranges from 800° C. to 1100° C. and which is higher than the calcining temperature T1 of the first calcining stage. As a result of calcining the mixture according to an aspect that includes these first and second calcining stages, preferable active material particles having a holed hollow structure disclosed herein can be suitably produced.

In addition, the hollow-structure positive electrode active material 610 described above may be a lithium transition metal oxide which has a layered structure and which includes nickel as a constituent element. Alternatively, the hollow-structure positive electrode active material 610 may be a lithium transition metal oxide which has a layered structure and which includes nickel, cobalt, and manganese as constituent elements.

With this lithium-ion secondary battery 100, the particle porosity A1 of the positive electrode active material 610 satisfies $2.0(\%) \leq A1 \leq 70(\%)$. In addition, the DBP absorption A2 of the positive electrode active material 610 satisfies $23 \text{ (mL/100 g)} \leq A2$. Furthermore, the tap density A3 of the positive electrode active material 610 satisfies $1.0 \text{ (g/mL)} \leq A3 \leq 1.9 \text{ (g/mL)}$. Hereinafter, the particle porosity A1, the DBP absorption A2, and the tap density A3 will be described step by step.

<Particle Porosity A1 (Particle Hole Volume Ratio)>

In this case, the particle porosity A1 represents a ratio of the hollow portion 920 to an apparent volume of the secondary particles 910 among the positive electrode active material 610 which includes the hollow portion 920 and the through hole 930. In other words, the particle porosity A1 can also be referred to as a "particle hole volume ratio". In this case, an "apparent volume" refers to a volume including holes.

<Measurement of Particle Porosity A1>

For example, as expressed by the equation below, the particle porosity A1 is a value obtained by dividing an inner volume of the hollow portion 920 by the apparent volume of the secondary particles 910 including the hollow portion 920.

Particle porosity $A1$=(Total inner volume $Vb$ of in-particle holes $B$ in positive electrode mixture layer 223)/(Apparent volume $Va1$ of positive electrode active material 610 in positive electrode mixture layer 223)

In other words, $A1 = Vb/Va1$.

Figure 12:
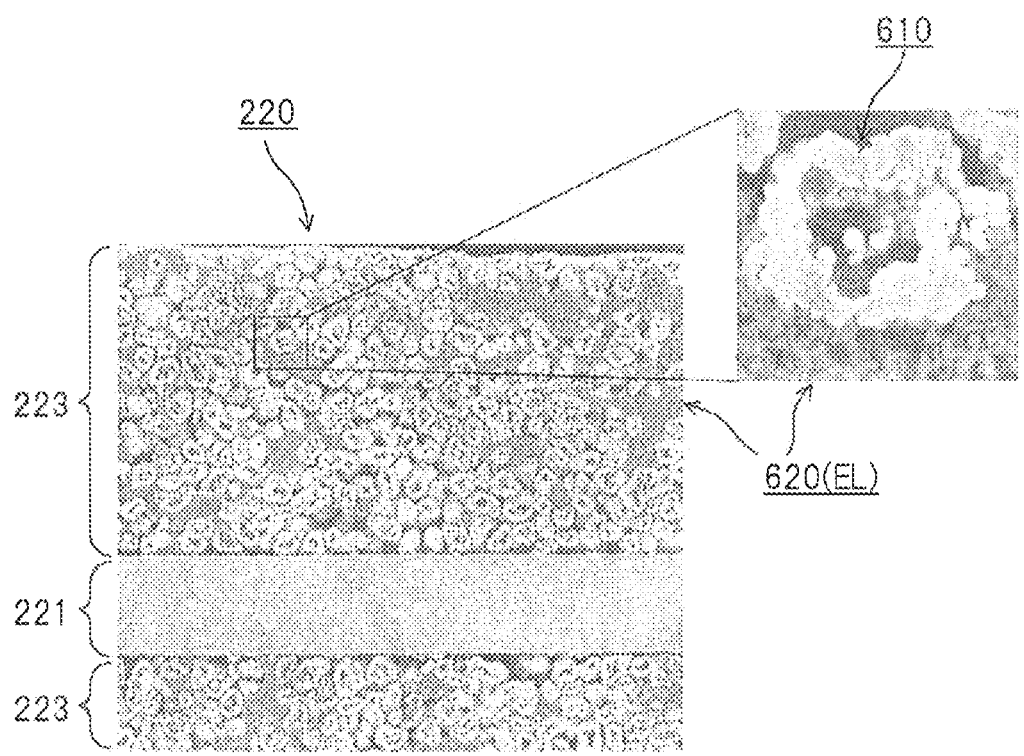
FIG. 12 is a cross sectional SEM image a positive electrode sheet.

The particle porosity A1 described above can be measured based on a sectional SEM image of the positive electrode mixture layer 223 such as that shown in FIG. 12. For example, such a sectional image can be obtained from a sectional SEM image of the positive electrode mixture layer 223. With a sectional SEM image showing a section of the positive electrode active material 610, based on differences in tonality and grayscale, the section of the positive electrode active material 610, in-particle holes B, and out-of-particle holes C can be distinguished from one another.

As shown in FIG. 5, the particle porosity A1 is a ratio ($Vb/Va1$) between the total inner volume $Vb$ of the in-particle holes B in the positive electrode mixture layer 223 and the apparent volume $Va$ of the positive electrode active material 610 in the positive electrode mixture layer 223. The ratio ($Vb/Va1$) can be approximated by a ratio ($Sb/Sa1$) between a surface area $Sb$ occupied by the in-particle holes B among the section of the positive electrode mixture layer 223 and an apparent sectional area $Sa1$ of the positive electrode active material 610 in the positive electrode mixture layer 223. The ratio (Sb/Sa1) can be approximated by a ratio between the number of dots of a portion that is distinguished as a section of the positive electrode active material 610 among the sectional SEM image and the number of dots of a portion that is distinguished as a section of the in-particle holes B1 and the positive electrode active material 610 among the sectional SEM image. In this case, a more accurate approximation can be performed by increasing the number of section samples.

<DBP Absorption A2>

Next, the DBP absorption A2 is obtained in compliance with JIS K6217-4 "Carbon black for rubber industry—Fundamental characteristics—Part 4: Determination of DBP absorption". Here, DBP (dibutylphthalate) is used as a reagent solution to be titrated using a constant-rate burette onto a test object powder (a powder of secondary particles 910 of the positive electrode active material 610), whereby a variation in viscosity characteristics is measured by a torque detector. Subsequently, an additive amount of the reagent solution per unit weight of the test object powder corresponding to a torque equivalent to 70% of a maximum generated torque is adopted as the DBP absorption (mL/100 g). For example, an absorption tester S410 manufactured by Asahisouken Co., Ltd. may be used as a measuring instrument for the DBP absorption A2.

<Tap Density A3>

Next, the tap density A3 refers to a density measured after tapping by a tapping-type particle reduction rate measuring instrument. In the present embodiment, a tapping-type particle reduction rate measuring instrument TPM-3 manufactured by TSUTSUI SCIENTIFIC INSTRUMENTS CO., LTD. was used as the tapping-type particle reduction rate measuring instrument. 60 g of powder of the secondary particles 910 of the positive electrode active material 610 was used as a sample. Subsequently, a measurement was performed according to Procedures 1 to 4 below.

Procedure 1: After thoroughly drying a dedicated measuring cylinder, place a measured sample in the measuring cylinder.

Procedure 2: Mount the measuring cylinder to the tapping-type particle reduction rate measuring instrument.

Procedure 3: Adjust tapping drop distance to 20 mm.

Procedure 4: After tapping 500 times with the tapping-type particle reduction rate measuring instrument, read the volume of the sample from the graduation on the measuring cylinder.

The tap density A3 is obtained by dividing a weight (in this case, 60 g) of the sample measured in Procedure 1 by a volume (mL) of the sample read in Procedure 4. A formula for obtaining the tap density A3 is given below.

Tap density $A3$(g/mL)=weight of sample(60g)/volume of sample(mL)

The present inventor prepared a plurality of samples of the positive electrode active material 610 whose particle porosity A1, DBP absorption A2, and tap density A3 differ from one another. Using the respective samples of the positive electrode active material 610, an evaluation test battery 800 (refer to FIG. 7) was created, and low-temperature reaction resistance, output characteristics, high-rate cycle characteristics, and low-rate cycle characteristics were respectively measured. Subsequently, effects of the particle porosity A1, the DBP absorption A2, and the tap density A3 on the performance of the lithium-ion secondary battery 100 were assessed.

For the evaluation test, a positive electrode active material 610 having a composition represented by $Li_{1.15}Ni_{0.33}Co_{0.34}Mn_{0.33}O_2$ was used as the positive electrode active material 610. However, by elaborating a generation process of the positive electrode active material 610, secondary particles of the positive electrode active material 610 were given a holed hollow structure as shown in FIG. 6.

In this case, positive electrode active materials were varied to obtain a plurality of samples of evaluation test lithium-ion secondary batteries. In addition, a plurality of batteries was created for each sample to be used in various tests. The results of the evaluation test are shown in Table 1. In Table 1, DBP absorption and mass ratio of a positive electrode active material and an electrically conductive material of each of Samples 1 to 18 are as shown in Table 1.

TABLE 1

| Sample | Particle porosity A1 (per particle) (vol %) | DBP absorption A2 (mL/100 g) | Tap density A3 (g/mL) | Particle diameter (average particle diameter D50) (μm) | Specific surface area (m²/g) | Low-temperature reaction resistance (Ω) | Output characteristics (W) 25° C. Porosity 30% | Output characteristics (W) 25° C. Porosity 45% | High-rate cycle characteristics (−15° C.) | Low-rate cycle characteristics 60° C. 2 C cycle Direct current resistance increase rate | Low-rate cycle characteristics 60° C. 2 C cycle Reaction resistance increase rate |
|---|---|---|---|---|---|---|---|---|---|---|---|
| 1 | 2.42 | 23.3 | 1.85 | 4.5 | 0.95 | 2.51 | 37.1 | 36.8 | 1.89 | 1.16 | 0.78 |
| 2 | 5.74 | 26.2 | 1.84 | 4.8 | 1.01 | 2.48 | 37.4 | 38.2 | 1.78 | 1.15 | 0.69 |
| 3 | 12.88 | 24.4 | 1.82 | 3.9 | 1.04 | 2.55 | 37.3 | 37.2 | 1.77 | 1.15 | 0.77 |
| 4 | 4.1 | 25.5 | 1.76 | 4 | 0.86 | 2.49 | 37.5 | 38.8 | 1.78 | 1.14 | 0.64 |
| 5 | 37.48 | 28.3 | 1.75 | 4.9 | 1.12 | 2.43 | 37.5 | 39.3 | 1.75 | 1.13 | 0.63 |
| 6 | 5.22 | 29.6 | 1.67 | 3.5 | 1.14 | 2.41 | 38.2 | 40.1 | 1.62 | 1.13 | 0.59 |
| 7 | 19.92 | 31.2 | 1.65 | 5.6 | 0.99 | 2.37 | 38.3 | 41.3 | 1.33 | 1.12 | 0.602 |
| 8 | 27.13 | 32.3 | 1.58 | 4.8 | 1.22 | 2.35 | 38.5 | 42.1 | 1.13 | 1.08 | 0.69 |
| 9 | 51.02 | 37.4 | 1.42 | 4.9 | 1.31 | 2.38 | 38.6 | 42.4 | 1.09 | 1.07 | 0.65 |
| 10 | 37.23 | 41.2 | 1.35 | 5.9 | 1.23 | 2.32 | 38.9 | 43.6 | 1.07 | 1.07 | 0.72 |
| 11 | 56.91 | 44.6 | 1.18 | 5.7 | 1.3 | 2.29 | 38.8 | 44.6 | 1.05 | 1.06 | 0.68 |
| 12 | 65.03 | 52 | 1.02 | 6.2 | 1.42 | 2.26 | 39.1 | 44.8 | 1.03 | 1.05 | 0.71 |
| 13 | — | 21.5 | 1.54 | 3.2 | 1.35 | 3.31 | 38.3 | 15.2 | 2.56 | 2.01 | 1.82 |
| 14 | 1.82 | 35 | 1.68 | 3.7 | 1.21 | 2.41 | 38.5 | 18.9 | 2.92 | 2.13 | 1.78 |
| 15 | — | 22 | 1.82 | 3.9 | 1.05 | 3.28 | 37.7 | 14.3 | 2.56 | 2.06 | 1.93 |

TABLE 1-continued

| Sample | Particle porosity A1 (per particle) (vol %) | DBP absorption A2 (mL/100 g) | Tap density A3 (g/mL) | Particle diameter (average particle diameter D50) (μm) | Specific surface area (m²/g) | Low-temperature reaction resistance (Ω) | Output characteristics (W) 25° C. Porosity 30% | Output characteristics (W) 25° C. Porosity 45% | High-rate cycle characteristics (−15° C.) | Low-rate cycle characteristics 60° C. 2 C cycle Direct current resistance increase rate | Low-rate cycle characteristics 60° C. 2 C cycle Reaction resistance increase rate |
|---|---|---|---|---|---|---|---|---|---|---|---|
| 16 | 1.29 | 32 | 1.73 | 4.4 | 1.19 | 2.4 | 37.6 | 17.4 | 3.11 | 2.19 | 1.87 |
| 17 | — | 22.58 | 2.04 | 3.7 | 0.89 | 3.18 | 35.1 | 10.1 | 3.2 | 2.25 | 1.91 |
| 18 | — | 20 | 2.23 | 5.6 | 0.67 | 3.45 | 34.4 | 8.2 | 4.5 | 2.34 | 1.99 |

Table 1 shows, for Samples 1 to 18, "particle porosity A1", "DBP absorption A2", "tap density A3", "particle diameter (average particle diameter D50)", "specific surface area", "low-temperature reaction resistance", "output characteristics", "high-rate cycle characteristics", and "low-rate cycle characteristics". Among these items, "particle porosity A1", "DBP absorption A2", "tap density A3", "particle diameter (average particle diameter D50)", and "specific surface area" were measured for Samples 1 to 18 of the positive electrode active material. In this case, measurement methods of "particle porosity A1", "DBP absorption A2", and "tap density A3" were as described earlier. Hereinafter, "particle diameter (average particle diameter D50)" and "specific surface area" will be described.

<Particle Diameter (Average Particle Diameter D50)>

Here, a measurement value obtained by a general laser diffractive particle size distribution measurement can be adopted as the particle diameter (average particle diameter D50) of the secondary particles 910 of the positive electrode active material 610. The particle diameter may be evaluated based on an a average particle diameter (D50). In this case, in order to keep an effect of a difference in particle diameters of the secondary particles 910 of the positive electrode active material 610 to battery performance at a low level, the average particle diameter (D50) of each sample was set to approximately 3 μm to 7 μm.

<Specific Surface Area>

In addition, a specific surface area is a surface area per unit weight. A measurement value by a general nitrogen adsorption method can be adopted as the specific surface area. Since an area over which the positive electrode active material 610 can come into contact with an electrolyte solution per unit weight increases as the specific surface area increases, an effect of improving battery performance can be expected. In contrast, for example, when the specific surface area of the positive electrode active material 610 is too small, an effect of improving reaction resistance (in particular, reaction resistance at low temperatures) decreases. In this case, in order to keep an effect of a difference in specific surface areas of the secondary particles 910 to battery performance at a low level, the specific surface area was set to within a certain range for each sample.

Next, in Table 1, "low-temperature reaction resistance", "output characteristics", "high-rate cycle characteristics", and "low-rate cycle characteristics" are, respectively, measurement values of the evaluation test battery 800 created using Samples 1 to 18 as the positive electrode active material 610. Hereinafter, the evaluation test battery 800 will be described. Subsequently, measurement methods of "porosity", "low-temperature reaction resistance", "output characteristics", "high-rate cycle characteristics", and "low-rate cycle characteristics" will be described.

<Evaluation Test Battery>

Figure 7:
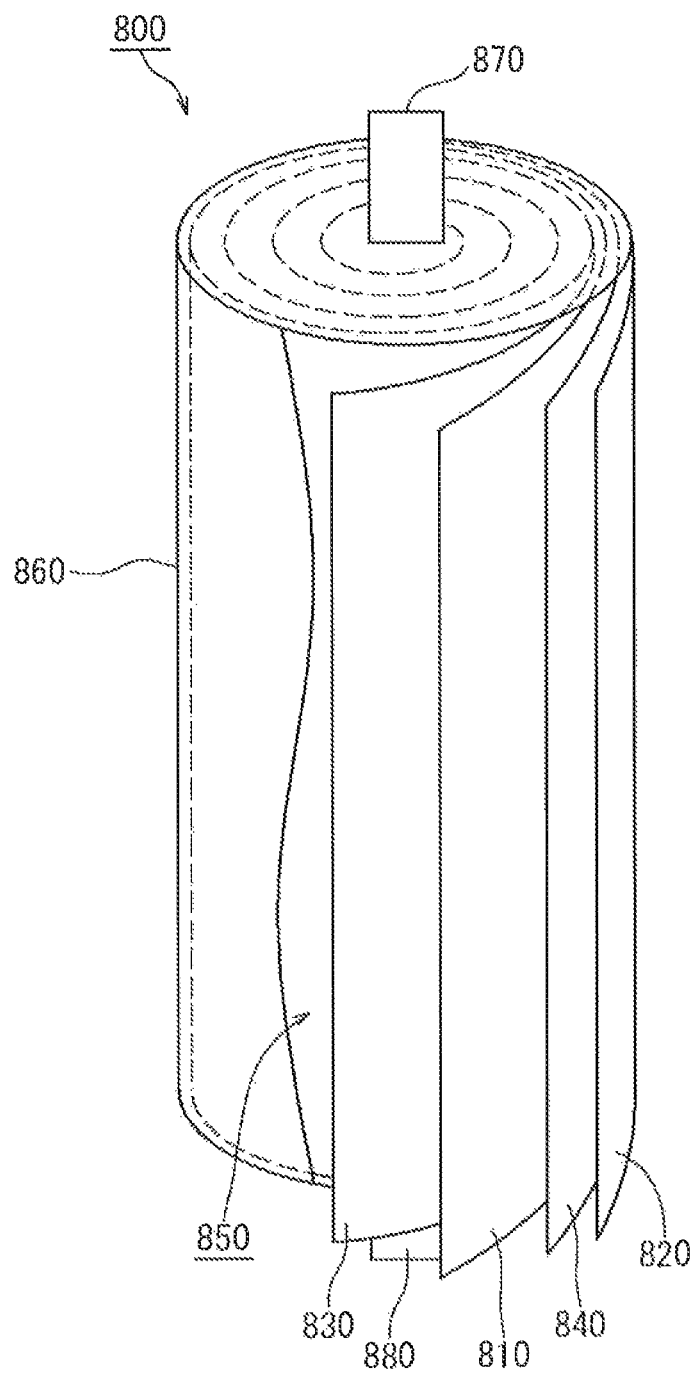
FIG. 7 is a schematic view of an 18650 cell used in an evaluation test.

FIG. 7 schematically shows the evaluation test battery 800. As shown in FIG. 7, the created evaluation test battery 800 is a cylindrical lithium-ion secondary battery commonly referred to as an 18650 cell. In this case, a rating capacity of the evaluation test battery 800 was set to approximately 220 mAh.

For the evaluation test battery 800, as shown in FIG. 7, a positive electrode sheet 810, a negative electrode sheet 820, and two separators 830 and 840 were laminated, and the laminated sheet was wound to fabricate a wound electrode body 850 in which the separators 830 and 840 were interposed between the positive electrode sheet 810 and the negative electrode sheet 820.

In this case, sectional structures of the positive electrode sheet 810 and the negative electrode sheet 820 of the evaluation test battery 800 were approximately similar to the sectional structures of the positive electrode sheet 220 or the negative electrode sheet 240 of the lithium-ion secondary battery 100 (refer to FIG. 1) described earlier. In addition, a porous polyethylene sheet with a thickness of 20 μm was used as the separators 830 and 840. This wound electrode body 850 was housed in an outer case 860 together with a non-aqueous electrolyte solution (not shown) to construct the evaluation test battery 800 (an evaluation test 18650 lithium ion battery).

In addition, for the positive electrode sheet 810, Samples 1 to 18 described earlier were used as the positive electrode active material 610 as shown in FIG. 6. In addition, for the evaluation test, acetylene black (AB) was used as the electrically conductive material 620. Furthermore, for the evaluation test, N-methyl-2-pyrrolidone (NMP) was used as a solvent. Moreover, polyvinylidene fluoride (PVDF) was used as the binder 630.

Figure 9:
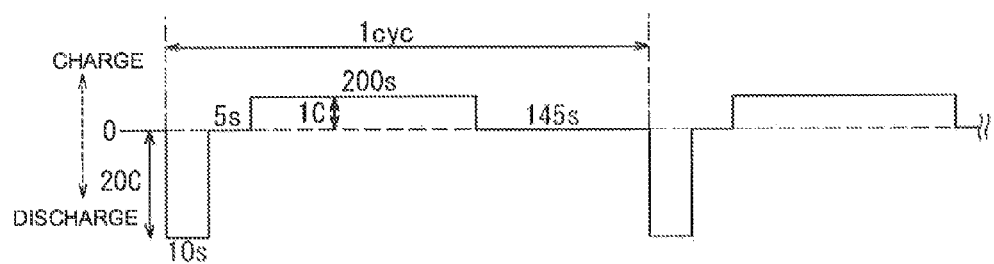
FIG. 9 is a diagram showing a charge-discharge cycle during a low-temperature high-rate cycle characteristics evaluation test.

In addition, as shown in FIG. 9, the outer case 860 had an approximately cylindrical shape, and electrode terminals 870 and 880 internally connected to the positive electrode sheet 810 and the negative electrode sheet 820 were provided at both side ends of the cylindrical shape. Moreover, as a non-aqueous electrolyte solution for the evaluation test battery 800, a non-aqueous electrolyte solution was used which had a composition obtained by dissolving $LiPF_6$ in a mixed solvent containing EC, DMC and EMC at a volume ratio of 3:3:4 to a concentration of 1 mol/L.

In the evaluation test, conditions with the exception of the positive electrode active material 610 were set approximately the same. In addition, an aluminum foil with a thickness of 15 μm was used as the positive electrode current collector. Furthermore, the amount of coating by the positive electrode mixture on the positive electrode current collector 221 was set to approximately 15 mg/cm². Moreover, for a same sample, a coating step and a rolling step of the positive electrode mixture were adjusted to create two types of positive electrode sheets 810 respectively having a positive electrode mixture layer 223 with a porosity of approximately 30% and a positive electrode mixture layer 223 with a porosity of approximately 45%, and two types of evaluation test batteries 800 were prepared.

<Porosity (Vbc/Va)>

A ratio (Vbc/Va) between an inner volume Vbc of the holes (B, C) formed inside the positive electrode mixture layer 223 and an apparent volume Va of the positive electrode mixture layer 223 represent a proportion of the holes (B, C) formed inside the positive electrode mixture layer 223. The greater the ratio (Vbc/Va), the greater the inner volume of the holes (B, C) through which an electrolyte solution can penetrate into the positive electrode mixture layer 223. The ratio (Vbc/Va) can be referred to as "porosity" or "in-mixture layer total hole ratio" when appropriate. There are various ways to obtain the ratio (Vbc/Va).

<Measurement Method of Va>

For example, as shown in FIG. 5, the apparent volume Va of a positive electrode mixture layer can be calculated as a product of a surface area S of a sample of the positive electrode sheet 220 in a plan view and a thickness a (not shown) of the positive electrode mixture layer 223 (Va=S×a).

In the present embodiment, the positive electrode mixture layer 223 is formed on both surfaces of the positive electrode current collector 221. Therefore, the thickness a of the positive electrode mixture layer 223 can be obtained as a sum of thicknesses b and c of the positive electrode mixture layers 223 of both surfaces (a=b+c). In addition, as another method, the thickness a of the positive electrode mixture layer 223 can be obtained as a difference (d−e) between a thickness d of the entire positive electrode sheet 220 and a thickness e of the positive electrode current collector 221 (a=d−e). Furthermore, the surface area S of a sample of the positive electrode sheet 220 in a plan view can be readily obtained by, for example, cutting out a square or a rectangle from a sample of the positive electrode sheet 220. As described above, by obtaining the surface area S of a sample of the positive electrode sheet 220 in a plan view and the thickness a of the positive electrode mixture layer 223, the apparent volume Va of the positive electrode mixture layer 223 can be obtained.

<Measurement Method of Vbc>

For example, the inner volume Vbc of the holes (B, C) formed inside the positive electrode mixture layer can be measured using a mercury porosimeter. Moreover, as far as this measurement method is concerned, a "hole" refers to a hole opened to the outside. With this method, closed spaces inside the positive electrode mixture layer 223 are not included in "holes". A mercury porosimeter is an instrument for measuring a micropore distribution of a porous body by the mercury intrusion method. For example, AutoPore III 9410 manufactured by SHIMADZU CORPORATION can be used as the mercury porosimeter. In this case, for example, a measurement may be performed between 4 psi to 60,000 psi (a micropore range from 50 μm to 0.003 μm).

For example, a plurality of samples is cut out from the positive electrode sheet 220. Next, for the samples, an inner volume of holes (B, C) contained in the positive electrode mixture layer 223 is measured using a mercury porosimeter. A mercury porosimeter is an instrument for measuring a micropore distribution of a porous body by the mercury intrusion method. In the mercury intrusion method, first, a sample of the positive electrode sheet 220 is vacuumed and immersed in mercury. In this state, as pressure applied to the mercury increases, the mercury gradually penetrates into smaller spaces. Therefore, an inner volume of the holes (B, C) in the positive electrode mixture layer 223 can be obtained based on a relationship between an amount of mercury having penetrated into the positive electrode mixture layer 223 and the pressure applied to the mercury. Due to the mercury intrusion method, the inner volume Vbc of the holes (B, C) contained in the positive electrode mixture layer 223 can be obtained.

<Calculation of Porosity (Vbc/Va)>

The porosity (Vbc/Va) can be obtained as a ratio between the inner volume Vbc of holes (B, C) contained in the positive electrode mixture layer 223, which can be obtained as described above, and the apparent volume Va (Va=S×a) of the positive electrode mixture layer. The ratio (Vbc/Va) obtained at this point represents a volume fraction at which holes penetrable by the electrolyte solution exist in the positive electrode mixture layer 223.

Particularly, in a case where the hollow-structure positive electrode active material 610 described above is used, holes are preferably included which enable an electrolyte solution to penetrate into the positive electrode mixture layer 223. Accordingly, the electrolyte solution can be perfused into the positive electrode mixture layer 223. According to findings made by the present inventor, when the hollow-structure positive electrode active material 610 described above is used, the ratio (Vbc/Va) of the positive electrode mixture layer 223 becomes 0.25≤(Vbc/Va). More favorably, the ratio satisfies approximately 0.30≤(Vbc/Va). In addition, the ratio (Vbc/Va) favorably satisfies (Vbc/Va)≤0.60 and, for example, suitably satisfies (Vbc/Va)≤0.57.

Moreover, when porosity (Vbc/Va) becomes too low, an amount of the electrolyte solution that penetrates into the positive electrode mixture layer 223 decreases and makes it difficult for lithium ions (Li) to migrate between the positive electrode active material 610 and the electrolyte solution. This may cause battery resistance to increase. In addition, when the porosity of the positive electrode mixture layer 223 increases, a depletion of the electrolyte solution is less likely to occur and lithium ions (Li ions) can migrate more easily between the positive electrode active material 610 and the electrolyte solution.

As shown, there is a tendency that the higher the porosity X of the positive electrode mixture layer 223, the better. Furthermore, although an upper limit is not particularly set, the porosity (Vbc/Va) need only have an appropriate and feasible magnitude. Therefore, the porosity (Vbc/Va) may have an appropriate and feasible magnitude and, for example, may be around 0.65. Moreover, while the porosity (Vbc/Va) may be greater than 65(%), an excessively high porosity (Vbc/Va) may prevent an electron pathway between the positive electrode active material 610 and the electrically conductive material 620 from being constructed and may result in a deterioration in collecting capability. For example, the porosity (Vbc/Va) may be set to 65% or lower such as at approximately 60% or more favorably at approximately 57(%). Accordingly, since electron pathways can be more reliably constructed between the positive electrode active material 610 and the electrically conductive material 620, a secondary battery with more stable performance can conceivably be obtained.

There are various ways to obtain the porosity (Vbc/Va). Other measurement methods will be exemplified below.

<Another Measurement Method (1) of Porosity (Vbc/Va)>

For example, the porosity (Vb/Va) is obtained by the equation below based on measured values of respective components as measured prior to creating the positive electrode sheet 810.

$$\text{Porosity}(Vbc/Va) = [(d-e) - Mv \times \{(\alpha/X) + (\beta/Y) + (\gamma/Z)\}]/(d-e).$$

In other words, $$\text{Porosity}(Vbc/Va) = [(\text{"thickness } d \text{ of positive electrode sheet } \mathbf{220}\text{"} - \text{"thickness } e \text{ of positive electrode current collector } \mathbf{221}\text{"}) - \text{"coating weight } Mv \text{ of both surfaces of positive electrode mixture layer } \mathbf{223}\text{"} \times \{(\text{weight ratio } \alpha \text{ of positive electrode active material } \mathbf{610})/(\text{true density } X \text{ of positive electrode active material } \mathbf{610}) + (\text{weight ratio } \beta \text{ of electrically conductive material } \mathbf{620})/(\text{true density } Y \text{ of electrically conductive material } \mathbf{620}) + (\text{weight ratio } \gamma \text{ of binder } \mathbf{630})/(\text{true density } Z \text{ of binder } \mathbf{630})\}]/(\text{"thickness } d \text{ of positive electrode sheet } \mathbf{220}\text{"} - \text{thickness } e \text{ of positive electrode current collector } \mathbf{221}\text{"}),$$

where "true density" is a value obtained by dividing weight by actual volume which does not include the holes.

In addition, $Mv \times \{(\alpha/X) + (\beta/Y) + (\gamma/Z)\}$ is a thickness of the positive electrode mixture layer 223 obtained when assuming that there are no holes in the positive electrode mixture layer 223.

In addition, for example, the "weight ratio α of the positive electrode active material 610", the "true density X of the positive electrode active material 610", the "weight ratio β of the electrically conductive material 620", the "true density Y of the electrically conductive material 620", the "weight ratio γ of the binder 630", and the "true density Z of the binder 630" can be measured prior to forming the positive electrode mixture layer 223. "True density" can be measured by a density measuring instrument such as a gas displacement pycnometer.

Furthermore, for example, a "thickness (d−e) of the positive electrode mixture layer 223" and the "coating weight Mv of the positive electrode mixture layer 223" can be measured after forming the positive electrode mixture layer 223. Moreover, the "thickness (d−e) of the positive electrode mixture layer 223" and the "coating weight Mv of the positive electrode mixture layer 223" can alternatively be set as target values in the coating step or the rolling step of the positive electrode mixture layer 223.

In addition, in the present embodiment, as shown in FIG. 5, the positive electrode mixture layer 223 is formed on both surfaces of the positive electrode current collector 221. Therefore, porosity may be calculated in consideration of the positive electrode mixture layer 223 being formed on both surfaces of the positive electrode current collector 221.

<Another Measurement Method (2) of Porosity (Vbc/Va)>

Porosity (Vbc/Va) can be approximated by yet another method.

For example, the porosity (Vbc/Va) can be approximated in a sectional sample of the positive electrode mixture layer 223 as a ratio (Sbc/Sa) between a surface area Sbc occupied by holes (B, C) included in a unit sectional area of the positive electrode mixture layer 223 and an apparent sectional area Sa of the positive electrode mixture layer 223. In this case, the ratio (Sbc/Sa) may be obtained from a plurality of sectional samples of the positive electrode mixture layer 223. The greater the number of sectional samples of the positive electrode mixture layer 223, the more accurate the approximation of porosity (Vbc/Va) by the ratio (Sbc/Sa). In this case, for example, sectional samples may be taken along one arbitrary direction of the positive electrode sheet 220 from a plurality of sections perpendicular to the one direction.

For example, the sectional samples of the positive electrode mixture layer 223 may be obtained as sectional SEM images. In this case, a sectional SEM image is a sectional photograph taken by an electron microscope. For example, an arbitrary section of the positive electrode sheet 220 may be obtained by a CP process (Cross Section Polisher process). For example, a scanning electron microscope (FE-SEM) HITACHI S-4500 manufactured by Hitachi High-Technologies Corporation. can be used as the electron microscope.

According to sectional SEM images of the positive electrode mixture layer 223, based on differences in tonality and grayscale, a section A of a constituent material of the positive electrode mixture layer 223 and holes (B, C) formed inside the positive electrode mixture layer 223 can be identified.

<Conditioning>

Next, a conditioning process, a measurement of rated capacity, and SOC adjustment for the evaluation test batteries constructed as described above will be described in order.

In this case, the conditioning process is performed according to Procedures 1 and 2 below.

Procedure 1: After reaching 4.1 V by charging at a constant current of 1 C, pause for 5 minutes.

Procedure 2: After Procedure 1, charge at a constant voltage for 1.5 hours and subsequently pause for 5 minutes.

<Measurement of Rated Capacity>

Next, after the conditioning process described above, rated capacity of the evaluation test batteries is measured according to Procedures 1 to 3 below at a temperature of 25° C. and within a voltage range of 3.0 V to 4.1 V.

Procedure 1: After reaching 3.0 V by discharging at a constant current of 1 C, discharge at a constant voltage for 2 hours and subsequently pause for 10 seconds.

Procedure 2: After reaching 4.1 V by charging at a constant current of 1 C, charge at a constant voltage for 2.5 hours and subsequently pause for 10 seconds.

Procedure 3: After reaching 3.0 V by discharging at a constant current of 0.5 C, discharge at a constant voltage for 2 hours and subsequently pause for 10 seconds.

Rated capacity: A discharge capacity (CCCV discharge capacity) of discharging from the constant current discharge to the constant voltage discharge in Procedure 3 is adopted as the rated capacity.

<SOC Adjustment>

SOC adjustment is performed on the evaluation test batteries prepared as described above according to Procedures 1 and 2 below under a temperature environment of 25° C. In this case, SOC adjustment may be performed after the conditioning process and the rated capacity measurement described above.

Procedure 1: Charge at a constant current of 1 C from 3V to reach a charged state equivalent to approximately 60% of the rated capacity (SOC 60%). Here, "SOC" refers to State of Charge.

Procedure 2: After Procedure 1, charge at a constant voltage for 2.5 hours.

Accordingly, the evaluation test batteries 800 can be adjusted to a predetermined charged state.

Next, with respect to the evaluation test battery 800, measurement methods of "low-temperature reaction resistance", "output characteristics", "high-rate cycle characteristics", and "low-rate cycle characteristics" will be described one by one. Moreover, in the present embodiment, for a same sample, a coating step and a rolling step of the positive electrode mixture were adjusted to create two types of positive electrode sheets 810 respectively having a positive electrode mixture layer 223 with a porosity of approximately 30% and a positive electrode mixture layer 223 with a porosity of approximately 45%, and two types of evaluation test batteries 800 were prepared. As for low-temperature reaction resistance", "high-rate cycle characteristics", and "low-rate cycle characteristics", measurement values of the evaluation test battery 800 in which the porosity of the positive electrode mixture layer 223 is approximately 30% were adopted. In addition, for the "output characteristics", a measurement value of the evaluation test battery 800 in which the porosity of the positive electrode mixture layer 223 is approximately 30% and a measurement value of the evaluation test battery 800 in which the porosity of the positive electrode mixture layer 223 is approximately 45% were adopted.

<Low-Temperature Reaction Resistance>

Figure 8:
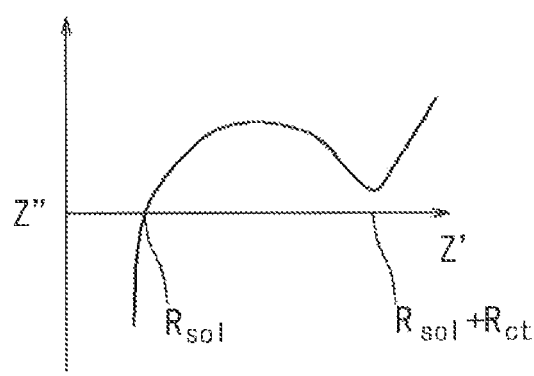
FIG. 8 is a diagram showing fitting of data to an equivalent circuit of a Nyquist plot during a reaction resistance measurement.

Reaction resistance is measured according to an alternating current impedance measurement method. FIG. 8 is a diagram showing fitting of data to an equivalent circuit of a Nyquist plot in reaction resistance measurement. In the present embodiment, measurements were performed under two measurement conditions, namely, at 25 degrees and SOC 60% (a charged state equivalent to approximately 60% of rated capacity) and at −30 degrees and SOC 40% (a charged state equivalent to approximately 40% of rated capacity). For the measurements, complex impedance measurements were performed in a frequency range of $10^{-3}$ to $10^4$ Hz. Subsequently, as shown in FIG. 8, a direct current resistance ($R_{sol}$) and a reaction resistance ($R_{ct}$) are calculated by fitting data to an equivalent circuit of a Nyquist plot. In this case, the reaction resistance ($R_{ct}$) can be obtained according to the following equation.

$$R_{ct} = (R_{ct} + R_{sol}) - R_{sol}$$

Here, a reaction resistance measured at −30 degrees and SOC 40% (a charged state equivalent to approximately 40% of rated capacity) is assumed to be a "low-temperature reaction resistance".

<Output Characteristics>

Output characteristics are obtained by the following procedures. Moreover, in the present embodiment, the measurement temperature environment is set to 25° C.

Procedure 1: As SOC adjustment, charge at a constant current of 1 C until SOC 60% is reached, charge at a constant voltage at the SOC 60% for 2.5 hours, and subsequently pause for 10 seconds.

Procedure 2: As constant wattage discharge, discharge at a constant wattage from the state of SOC 60% by Procedure 1. Then, measure the number of seconds until 2.5 V is reached.

Procedure 3: Repeat Procedures 1 and 2 by varying constant wattage discharge conditions within a range of 5 to 50 W in Procedure 2.

Procedure 4: Plot the numbers of seconds until 2.5 V was reached as measured under the respective W conditions on an abscissa, plot W corresponding to the measured numbers of seconds on an ordinate, and calculate W at 10 seconds from an approximate curve.

In this case, W obtained in Procedure 4 is adopted as output characteristics.

<High-Rate Discharge Characteristics Evaluation>

For the "high-rate discharge characteristics evaluation", for different evaluation test batteries 800, after an adjustment is made to a charged state of SOC 60% by the SOC adjustment described above, a high-rate cycle test is performed in which a charge-discharge cycle constituted by (I) to (V) below is repeated 2500 times. During that time, an operation is performed once every 100 cycles for adjusting the SOC to 60%. FIG. 9 shows a charge-discharge cycle in the characteristic evaluation test.

(I) Discharge for 10 seconds at a constant current of 20 C (in this case, 4.4 A).

(II) Pause for 5 seconds.

(III) Charge for 200 seconds at a constant current of 1 C.

(IV) Pause for 145 seconds.

(V) Measure the rate of increase of resistance during the discharging of (I) for each cycle.

(However, the SOC adjustment described above is performed once every 100 repetitions of the charge-discharge cycle constituted by (I) to (V)).

"High-rate discharge characteristics evaluation" in Table 1 represents a rate of increase of resistance of the discharge of (I) in the 2500th cycle.

<Low-Rate Cycle Characteristics>

For the "low-rate cycle characteristics", for different evaluation test batteries 800, an alternating-current impedance measurement method is performed at 25° C. to calculate a direct current resistance ($R_{sol}$) and a reaction resistance ($R_{ct}$). In this case, the alternating-current impedance measurement method conforms to the method described in "Low-temperature reaction resistance". Subsequently, a charge-discharge cycle constituted by (I) and (II) below is repeated 1000 times at a temperature of 60° C. and in a voltage range of 3.0 V to 4.1 V.

<Charge-Discharge Cycle for Low-Rate Cycle Characteristics>

(I) Reach 3 V by discharging at 2 C at a constant voltage.

(II) Reach 4.1 V by discharging at 2 C at a constant voltage.

<Increase Rates of Direct Current Resistance ($R_{sol}$) and Reaction Resistance ($R_{ct}$)>

Subsequently, an alternating-current impedance measurement method is performed at 25° C. on the evaluation test batteries 800 to calculate a direct current resistance ($R_{sol}$) and a reaction resistance ($R_{ct}$). Increase rates of the direct current resistance ($R_{sol}$) and the reaction resistance ($R_{ct}$) are then respectively obtained by dividing resistance values calculated after 1000 cycles by initial resistances (a direct current resistance ($R_{sol}$) and a reaction resistance ($R_{ct}$) calculated 1000 cycles ago).

Increase rate=resistance value after 1000 cycles/resistance value of 1000 cycles ago Based on such tests, the following findings are made. With lithium-ion secondary batteries as vehicle-mounted power supplies which are required to produce a particularly high output upon startup and acceleration, a necessary performance may not necessarily be obtained by simply evaluating DBP absorption (mL/100 g). For example, while Patent Literature 1 describes that favorable DBP absorption (mL/100 g) of the positive electrode active material 610 ranges from 20 to 40, phenomena where a low-temperature reaction resistance, high-rate cycle characteristics, or low-rate cycle characteristics increase were observed as is the case of Samples 13 to 18.

However, for example, as shown in FIG. 6, when using a positive electrode active material 610 which is constituted by hollow-structure secondary particles 910 formed by the aggregation of a plurality of primary particles 900 of a lithium transition metal oxide and which has a through hole 930 penetrating from outside to a hollow portion 920, the tendencies described above differ. Specifically, when using the positive electrode active material 610 described above, by taking particle porosity A1 and tap density A3 into consideration in addition to DBP absorption (mL/100 g), a lithium-ion secondary battery 100 with favorable low-temperature reaction resistance, high-rate cycle characteristics, and low-rate cycle characteristics can be obtained.

In this case, the particle porosity A1 of the positive electrode active material favorably satisfies 2.0(%)≤A1≤70 (%). In addition, the DBP absorption A2 of the positive electrode active material favorably satisfies 23 (mL/100 g)≤A2. Furthermore, the tap density A3 of the positive electrode active material favorably satisfies 1.0 (g/mL)≤A3≤1.9 (g/mL).

The particle porosity A1 defines how many holes B are formed in the secondary particles 910 of the positive electrode active material 610. When the particle porosity A1 satisfies 2.0(%)≤A1≤70(%), a desirable amount of holes into which an electrolyte solution can penetrate is conceivably formed in the positive electrode active material 610. When a desirable amount of holes into which an electrolyte solution can penetrate is formed in the positive electrode active material 610, since the electrolyte solution penetrates into the secondary particles 910, a contact surface area between the primary particles 900 of the positive electrode active material 610 and the electrolyte solution increases and lithium ions (Li) can migrate more readily. In contrast, an excessively low particle porosity A1 makes it difficult for the electrolyte solution to penetrate into the secondary particles 910 and necessary effects obtainable when the electrolyte solution penetrates into the secondary particles 910 can no longer be obtained.

For example, the particle porosity A1 of the positive electrode active material 610 may satisfy 2.4(%)≤A1. Accordingly, since the electrolyte solution can more readily penetrate into the positive electrode active material 610, performance required of the positive electrode active material can be more reliably obtained.

Figure 10:
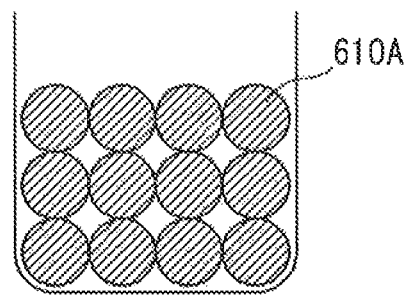
FIG. 10 is a diagram showing an example of a positive electrode active material with high tap density.
Figure 11:
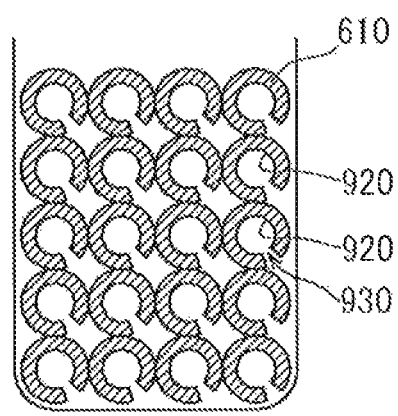
FIG. 11 is a diagram showing an example of a positive electrode active material with small tap density.

In addition, the tap density A3 enables to estimate a level of the bulk of the positive electrode active material 610 after tapping. In this case, for example, the positive electrode active material 610 which includes the hollow portion 920 and the through hole 930 as shown in FIG. 11 conceivably has a greater bulk after tapping (a lower tap density A3) than a positive electrode active material 610A which does not have a hollow portion (hole) as shown in FIG. 10. In this case, in the positive electrode active material 610 whose bulk after tapping is greater (whose tap density A3 is lower), the hollow portion 920 effectively exists and a contact surface area between the positive electrode active material 610 and an electrolyte solution increases. Accordingly, the electrically conductive material 620 becomes denser and an electron pathway between the positive electrode active material 610 and the electrically conductive material 620 is more reliably constructed. Therefore, conceivably, a secondary battery with more stable performance can be obtained. FIG. 12 shows an example of a sectional SEM image of the positive electrode mixture layer 223. For example, the electrically conductive material 620 is densely aggregated between particles of the positive electrode active material 610 as depicted in a portion denoted as EL in FIG. 12.

As described above, the positive electrode active material 610 is used which is constituted by hollow-structure secondary particles 910 formed by the aggregation of a plurality of primary particles of a lithium transition metal oxide and which has the through hole 930 penetrating from outside to the hollow portion 920. In addition, the particle porosity A1 of the positive electrode active material is set so as to satisfy 2.0(%)≤A1≤70(%). Furthermore, the DBP absorption A2 of the positive electrode active material is set so as to satisfy 23 (mL/100 g)≤A2. Moreover, the tap density A3 of the positive electrode active material is set so as to satisfy 1.0 (g/mL)≤A3≤1.9 (g/mL). Accordingly, the lithium-ion secondary battery 100 with favorable low-temperature reaction resistance, high-rate cycle characteristics, and low-rate cycle characteristics can be obtained.

Moreover, when the particle porosity A1 of the positive electrode active material 610 increases, since the hollow portion 920 of the positive electrode active material 610 increases and an electrolyte solution penetrates into the hollow portion 920, a depletion of the electrolyte solution is less likely to occur. In addition, inside the positive electrode active material 610, lithium ions (Li ions) migrate between the electrolyte solution having penetrated into the hollow portion and the positive electrode active material 610. Therefore, since the primary particles 900 of the positive electrode active material 610 in a vicinity of the hollow portion are also utilized, an output of the secondary battery increases.

In this case, the particle porosity A1 of the positive electrode active material may satisfy 2.4(%)≤A1 and, more favorably, may satisfy 25(%)≤A1. In addition, while an upper limit of the particle porosity A1 of the positive electrode active material is not particularly set, for example, the particle porosity A1 may satisfy A1≤70(%) or, for example, may be set to around A1≤66(%).

Furthermore, when the DBP absorption A2 of the positive electrode active material increases, since an electrolyte solution more readily penetrates into the positive electrode active material 610, a depletion of the electrolyte solution is less likely to occur. Therefore, for example, the DBP absorption A2 of the positive electrode active material 610 may satisfy (mL/100 g)≤A2 or may further satisfy 32 (mL/100 g)≤A2. In addition, while an upper limit of the DBP absorption A2 is not particularly set, for example, the DBP absorption A2 may satisfy A2≤54 (mL/100 g).

Moreover, the lower the tap density A3 of the positive electrode active material, the greater the bulk and the lower the bulk density of the positive electrode active material 610. In this case, a density of the positive electrode mixture layer 223 after rolling may also decrease. Furthermore, in this case, since the bulk of the positive electrode active material 610 is large, a space of the electrically conductive material 620 conceivably decreases in inverse proportion to the bulk. Therefore, an out-of-particle hole C of the positive electrode active material 610 conceivably becomes smaller during a rolling step when forming the positive electrode mixture layer 223. As a result, the electrically conductive material 620 existing among the positive electrode active material 610 becomes denser and an electron pathway between the positive electrode active material 610 and the electrically conductive material 620 is more reliably constructed. Therefore, conceivably, a secondary battery with more stable performance can be obtained. For example, the tap density A3 may be set to around A3≤1.7 (g/mL).

As shown, by having the particle porosity A1, the DBP absorption A2, and the tap density A3 described above, a lithium secondary battery which has low internal resistance (in other words, favorable output characteristics) and which demonstrates little increase in resistance attributable to charge-discharge cycling (particularly, charge-discharge cycling that includes high-rate discharge) can be obtained in a more reliable manner.

In addition, a particle diameter D as defined by D50 of the secondary particles 910 of the positive electrode active material 610 may satisfy 3 (μm)≤D≤7 (μm). In this case, the particle diameter D is defined based on an external shape of the secondary particles 910 of the positive electrode active material 610 without considering the hollow portion 920 of the secondary particles 910. In addition, when the particle diameter D satisfies 3 (μm)≤D≤7 (μm), the positive electrode active material 610 has a predetermined size or a greater size and holes with a predetermined size or a greater size can be formed inside the positive electrode active material 610.

Furthermore, a specific surface area E of the secondary particles 910 of the positive electrode active material 610 may satisfy 0.8 (m$^2$/g)≤E≤1.5 (m$^2$/g). The hollow-structure positive electrode active material 610 satisfying this specific surface area condition can be used for a positive electrode of the lithium-ion secondary battery 100 and is capable of demonstrating a higher performance in a stable manner. For example, a lithium secondary battery can be constructed that has low internal resistance (or in other words, favorable output characteristics) and demonstrates little increase in resistance attributable to charge-discharge cycling (particularly, charge-discharge cycling that includes high-rate discharge).

In addition, the positive electrode mixture layer may be obtained by rolling after a positive electrode mixture is coated on a current collector and then dried. In this case, since the tap density A3 of the positive electrode active material 610 satisfies 1.0 (g/mL)≤A3≤1.9 (g/mL), even if the positive electrode mixture layer is obtained by rolling after a positive electrode mixture is coated on a current collector and then dried, the bulk is greater than the true density of the positive electrode active material. Furthermore, since the particle porosity A1 of the positive electrode active material 610 satisfies 2.0(%)≤A1≤70(%) and the DBP absorption A2 of the positive electrode active material 610 satisfies 23 (mL/100 g)≤A2, gaps that allow an electrolyte solution to penetrate into the positive electrode mixture layer are more reliably formed. Moreover, since the particle porosity A1 of the positive electrode active material 610 satisfies 2.0(%)≤A1≤70(%), a contact surface area between the electrolyte solution having penetrated into the positive electrode mixture layer and the positive electrode active material is large. In addition, the DBP absorption A2 of the positive electrode active material satisfies 23 (mL/100 g)≤A2. Therefore, the electrolyte solution having penetrated into the positive electrode mixture layer is more readily absorbed by the positive electrode active material. As a result, the concentration of lithium ions (Li ions) in the positive electrode mixture layer is less likely to become uneven. Accordingly, a lithium secondary battery can be constructed that has low internal resistance (or in other words, favorable output characteristics) and demonstrates little increase in resistance attributable to charge-discharge cycling (particularly, charge-discharge cycling that includes high-rate discharge).

<Positive Electrode Active Material>

With the positive electrode active material 610 described above, a lithium secondary battery can be constructed that has low internal resistance (or in other words, favorable output characteristics) and demonstrates little increase in resistance attributable to charge-discharge cycling (particularly, charge-discharge cycling that includes high-rate discharge). Therefore, in a favorable aspect of a positive electrode active material capable of improving high-rate charge-discharge cycling characteristics, the positive electrode active material is constituted by hollow-structure secondary particles formed by the aggregation of a plurality of primary particles of a lithium transition metal oxide and has a through hole penetrating from outside to a hollow portion of the secondary particles. Furthermore, with the positive electrode active material 610, a particle porosity A1 favorably satisfies 2.0(%)≤A1≤70(%), a DBP adsorption A2 favorably satisfies 23 (mL/100 g)≤A2, and a tap density A3 favorably satisfies 1.0 (g/mL)≤A3≤1.9 (g/mL).

In addition, move favorably, the particle porosity A1 of the positive electrode active material satisfies 25(%)≤A1≤66 (%). Furthermore, the DBP absorption A2 of the positive electrode active material favorably satisfies 30 (mL/100 g)≤A2. Moreover, the tap density A3 of the positive electrode active material favorably satisfies 1.0 (g/mL)≤A3≤1.7 (g/mL). Accordingly, a lithium secondary battery which has low internal resistance (or in other words, favorable output characteristics) and which demonstrates little increase in resistance attributable to charge-discharge cycling (particularly, charge-discharge cycling that includes high-rate discharge) can be constructed more reliably.

Figure 13:
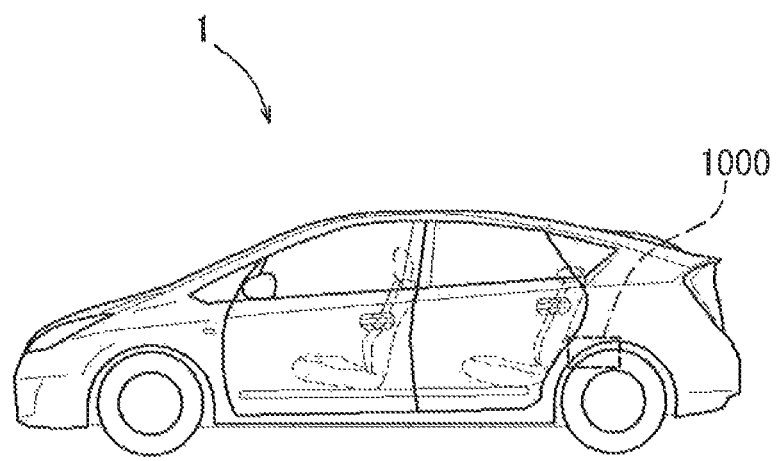
FIG. 13 is a diagram showing an example of a vehicle mounted with a vehicle drive battery.

As described above, the lithium-ion secondary battery 100 including the active material particles disclosed herein is superior in output characteristics and in endurance. Therefore, the lithium-ion secondary battery 100 is suitable as a lithium-ion secondary battery to be mounted on a vehicle 1 as shown in FIG. 13. In this case, for example, the lithium-ion secondary battery 100 can be suitably used as a power supply for a motor of a vehicle such as an automobile in the form of an assembled battery 1000 in which a plurality of the lithium-ion secondary batteries is connected to each other.

Although a lithium-ion secondary battery according to an embodiment of the present invention has been exemplified and various embodiments of the present invention have been described, the present invention is not limited to any of the embodiments above. Moreover, while a lithium-ion secondary battery is exemplified above, the present invention may be applied to structures of positive electrode mixture layers in secondary batteries other than a lithium-ion secondary battery.

REFERENCE SINGS LIST 100 lithium-ion secondary battery (secondary battery)
200 wound electrode body
220 positive electrode sheet
221 positive electrode current collector
222 uncoated portion
222a intermediate portion
223 positive electrode mixture layer
224 positive electrode mixture
240 negative electrode sheet
241 negative electrode current collector
242 uncoated portion
243 negative electrode mixture layer
244 negative electrode mixture
245 heat-resistant layer
262 separator
264 separator
300 battery case
310, 312 gap
320 container main body
322 joint of lid and container main body
340 lid
360 safety valve
420 electrode terminal (positive electrode)

440 electrode terminal (negative electrode)
610 positive electrode active material
620 electrically conductive material
630 binder
800 evaluation test battery
810 positive electrode sheet
820 negative electrode sheet
830, 840 separator
850 wound electrode body
860 outer case
870 electrode terminal
900 primary particles
910 secondary particles
920 hollow portion
930 through holes
1000 vehicle drive battery

The invention claimed is:

1. A secondary battery comprising:
a current collector; and
a positive electrode mixture layer coated on the current collector, wherein
the positive electrode mixture layer includes a positive electrode active material, an electrically conductive material, and a binder,
the positive electrode active material is constituted by hollow-structure secondary particles formed by the aggregation of a plurality of primary particles of a lithium transition metal oxide and has a through hole penetrating from outside to a hollow portion,
a particle porosity A1 of the positive electrode active material satisfies $25\% \leq A1 \leq 70\%$,
a DBP absorption A2 of the positive electrode active material satisfies $23 \text{ mL}/100 \text{ g} \leq A2$,
a tap density A3 of the positive electrode active material satisfies $1.0 \text{ g/mL} \leq A3 \leq 1.35 \text{ g/mL}$,
a porosity of the positive electrode mixture layer ranges from 40% to 65%, and
the secondary particles consist of the positive electrode active material but not including an electrically conductive material.

2. The secondary battery according to claim 1, wherein the particle porosity A1 of the positive electrode active material satisfies $A1 \leq 66\%$.

3. The secondary battery according to claim 1, wherein the DBP absorption A2 of the positive electrode active material satisfies $32 \text{ mL}/100 \text{ g} \leq A2$.

4. The secondary battery according to claim 1, wherein the DBP absorption A2 of the positive electrode active material satisfies $A2 \leq 54 \text{ mL}/100 \text{ g}$.

5. The secondary battery according to claim 1, wherein a particle diameter D as defined by D50 of the secondary particles of the positive electrode active material satisfies $3 \mu m \leq D \leq 7 \mu m$.

6. The secondary battery according to claim 1, wherein a specific surface area E of the secondary particles of the positive electrode active material satisfies $0.8 \text{ m}^2/\text{g} \leq E \leq 1.5 \text{ m}^2/\text{g}$.

7. The secondary battery according to claim 1, wherein an opening width of the through hole is on average equal to or greater than 0.01 μm.

8. The secondary battery according to claim 1, wherein the opening width of the through hole is on average 2.0 μm or less.

9. The secondary battery according to claim 1, wherein the positive electrode mixture layer is obtained by rolling after the positive electrode mixture is coated on the current collector and then dried.

10. The secondary battery according to claim 1, wherein the positive electrode active material is produced by a production method comprising:
a raw material hydroxide formation step of supplying ammonium ions to an aqueous solution of a transition metal compound and precipitating particles of a transition metal hydroxide from the aqueous solution, with this aqueous solution containing at least one transition metal element that composes the lithium transition metal oxide;
a mixing step of mixing the transition metal hydroxide with a lithium compound to prepare an unfired mixture; and
a calcining step of calcining the mixture to obtain the active material particles, wherein
the raw material hydroxide formation step includes:
a nucleation stage in which the transition metal hydroxide is precipitated from the aqueous solution at pH 12 or higher and an ammonium ion concentration of 25 g/L or less; and
a particle growth stage in which the precipitated transition metal hydroxide is grown at a pH less than 12 and an ammonium ion concentration of 3 g/L or more.

11. A vehicle driving battery constituted by the secondary battery according to claim 1.

12. The secondary battery according to claim 1, wherein the hollow portion is a space enclosed by the aggregation of the primary particles in which gaps are substantially not present at the grain boundaries of the primary particles other than the hollow portion and the through-hole.

13. A positive electrode active material comprising:
hollow-structure secondary particles formed by the aggregation of a plurality of primary particles of a lithium transition metal oxide; and
a through hole penetrating from outside to a hollow portion of the secondary particles, wherein
the secondary particles consist of the positive electrode active material but not including an electrically conductive material,
a particle porosity A1 of the positive electrode active material satisfies $20\% \leq A1 \leq 70\%$,
a DBP absorption A2 of the positive electrode active material satisfies $23 \text{ mL}/100 \text{ g} \leq A2 \leq 54 \text{ mL}/100 \text{ g}$, and
a tap density A3 of the positive electrode active material satisfies $1.0 \text{ g/mL} \leq A3 \leq 1.35 \text{ g/mL}$.

* * * * *